(12) United States Patent
Dai et al.

(10) Patent No.: US 10,605,963 B2
(45) Date of Patent: Mar. 31, 2020

(54) TELEPHOTO CAMERA LENS HAVING A PLURALITY OF LENSES PROVIDING TELEPHOTO PERFORMANCE

(71) Applicant: ZHEJIANG SUNNY OPTICS CO., LTD., Ningbo, Zhejiang (CN)

(72) Inventors: Fujian Dai, Zhejiang (CN); Lin Huang, Zhejiang (CN)

(73) Assignee: ZHEJIANG SUNNY OPTICS CO., LTD., Zhejiang (CN)

( * ) Notice: Subject to any disclaimer, the term of this patent is extended or adjusted under 35 U.S.C. 154(b) by 425 days.

(21) Appl. No.: 15/329,174

(22) PCT Filed: May 24, 2016

(86) PCT No.: PCT/CN2016/083097
§ 371 (c)(1),
(2) Date: Jan. 25, 2017

(87) PCT Pub. No.: WO2017/148020
PCT Pub. Date: Sep. 8, 2017

(65) Prior Publication Data
US 2018/0335549 A1    Nov. 22, 2018

(30) Foreign Application Priority Data

Mar. 2, 2016  (CN) .......................... 2016 1 0118808

(51) Int. Cl.
*G02B 23/00* (2006.01)
*G02B 3/00* (2006.01)
(Continued)

(52) U.S. Cl.
CPC ............. *G02B 3/0043* (2013.01); *G02B 9/62* (2013.01); *G02B 13/0045* (2013.01); *G02B 13/02* (2013.01)

(58) Field of Classification Search
CPC .. G02B 3/0043; G02B 13/00; G02B 13/0045; G02B 13/02; G02B 13/06; G02B 13/18;
(Continued)

(56) References Cited

U.S. PATENT DOCUMENTS 5,959,788 A     9/1999  Yamakawa et al.
9,726,857 B2 *  8/2017  Chen .................. G02B 13/0045
(Continued)

FOREIGN PATENT DOCUMENTS

CN           1366195 A       8/2002
CN         202256844 U       5/2012
(Continued)

OTHER PUBLICATIONS

International search report and written opinions for PCT application PCT/CN2016/083097, filed May 24, 2016.
(Continued)

*Primary Examiner* — Arnel C Lavarias
(74) *Attorney, Agent, or Firm* — David D. Brush; Westman, Champlin & Koehler, P.A.

(57) ABSTRACT

A telephoto camera lens sequentially includes from an object side to an image side, a first lens with positive optical power, an object-side face of the first lens being convex; a second lens with optical power; a third lens with optical power; a fourth lens with optical power; a fifth lens with optical power, an object-side face of the fifth lens being concave; and a sixth lens with optical power, an object-side face of the sixth lens being concave near an axis, and an image-side face of the sixth lens being convex near the axis. The telephoto lens satisfies: 0.75<TTL/f<1.0, and ImgH/f<0.55, wherein TTL represents a distance between the object-side face of the first lens and an imaging face along the axis, f
(Continued)

represents an effective focal length of the telephoto camera lens, and ImgH is half of a diagonal line of an effective pixel region on the imaging face.

7 Claims, 11 Drawing Sheets

(51) Int. Cl.
　　　*G02B 13/02*　　　(2006.01)
　　　*G02B 13/00*　　　(2006.01)
　　　*G02B 9/62*　　　(2006.01)

(58) Field of Classification Search
　　　CPC . G02B 25/04; G02B 9/00; G02B 9/62; G02B 13/001; G02B 13/0015; G02B 13/002
　　　USPC ....... 359/425, 714, 770, 642, 745, 754, 756, 359/757, 758, 759, 760, 796, 797
　　　See application file for complete search history.

(56) References Cited

U.S. PATENT DOCUMENTS

| | | | | |
|---|---|---|---|---|
| 9,726,858 | B2 * | 8/2017 | Huang | G02B 13/0045 |
| 9,857,559 | B2 * | 1/2018 | Huang | H04N 5/2254 |
| 2002/0135890 | A1 | 9/2002 | Tochigi | |
| 2011/0176049 | A1 * | 7/2011 | Hsieh | G02B 13/0045 348/340 |
| 2012/0069140 | A1 * | 3/2012 | Tsai | G02B 13/0045 348/36 |
| 2012/0087020 | A1 * | 4/2012 | Tang | G02B 13/0045 359/714 |
| 2012/0314301 | A1 | 12/2012 | Huang et al. | |
| 2013/0050840 | A1 * | 2/2013 | Oskotsky | G02B 13/22 359/663 |
| 2015/0362702 | A1 | 12/2015 | Tang et al. | |
| 2016/0252710 | A1 * | 9/2016 | Lee | G02B 13/0045 359/714 |
| 2017/0184818 | A1 * | 6/2017 | Dai | G02B 13/06 |
| 2017/0307855 | A1 * | 10/2017 | Lu | G02B 9/62 |
| 2017/0322391 | A1 * | 11/2017 | Kang | G02B 27/0025 |
| 2018/0017764 | A1 * | 1/2018 | Kang | G02B 9/60 |

FOREIGN PATENT DOCUMENTS

| | | |
|---|---|---|
| CN | 105278085 A | 1/2016 |
| JP | H1183792 A | 3/1999 |
| JP | 3934197 B2 | 6/2007 |

OTHER PUBLICATIONS

English translation of international search report for PCT application PCT/CN2016/083097, filed May 24, 2016.

Office action from SIPO for CN application 201610118808.9.

English translation of office action from SIPO for CN application 201610118808.9.

English translation of the International Search Report dated Sep. 1, 2016, for corresponding International Application No. PCT/CN2016/083097, filed May 24, 2016.

English translation of the Written Opinion of the International Searching Authority dated Sep. 1, 2016, for corresponding International Application No. PCT/CN2016/083097, filed May 24, 2016.

* cited by examiner

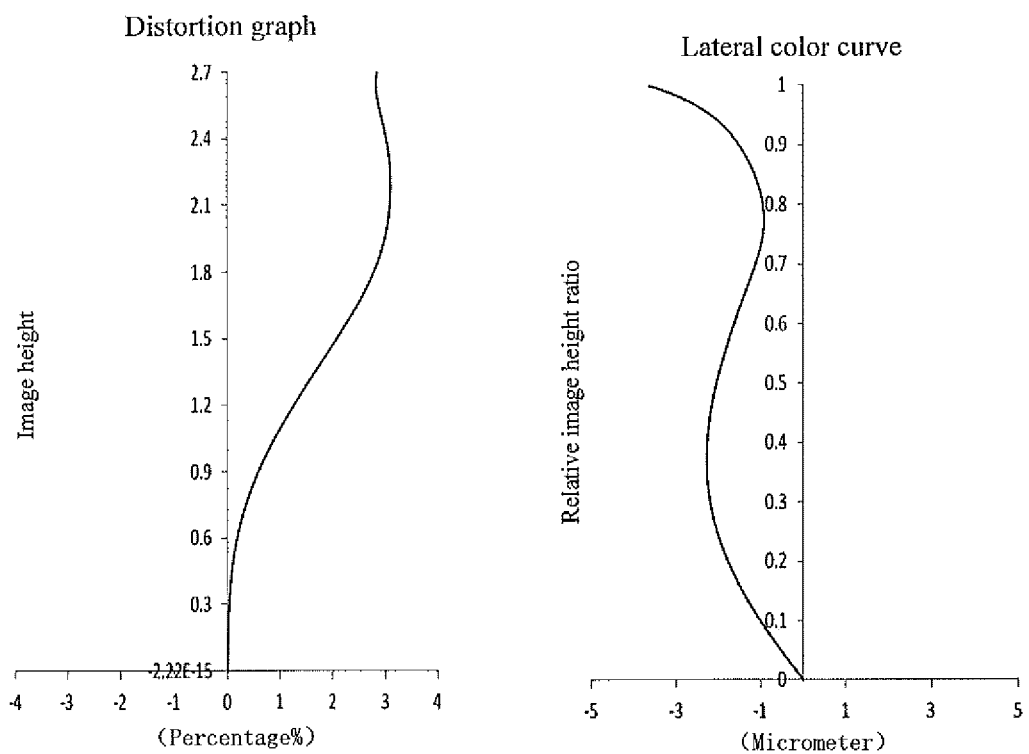
Fig.4
Fig.5
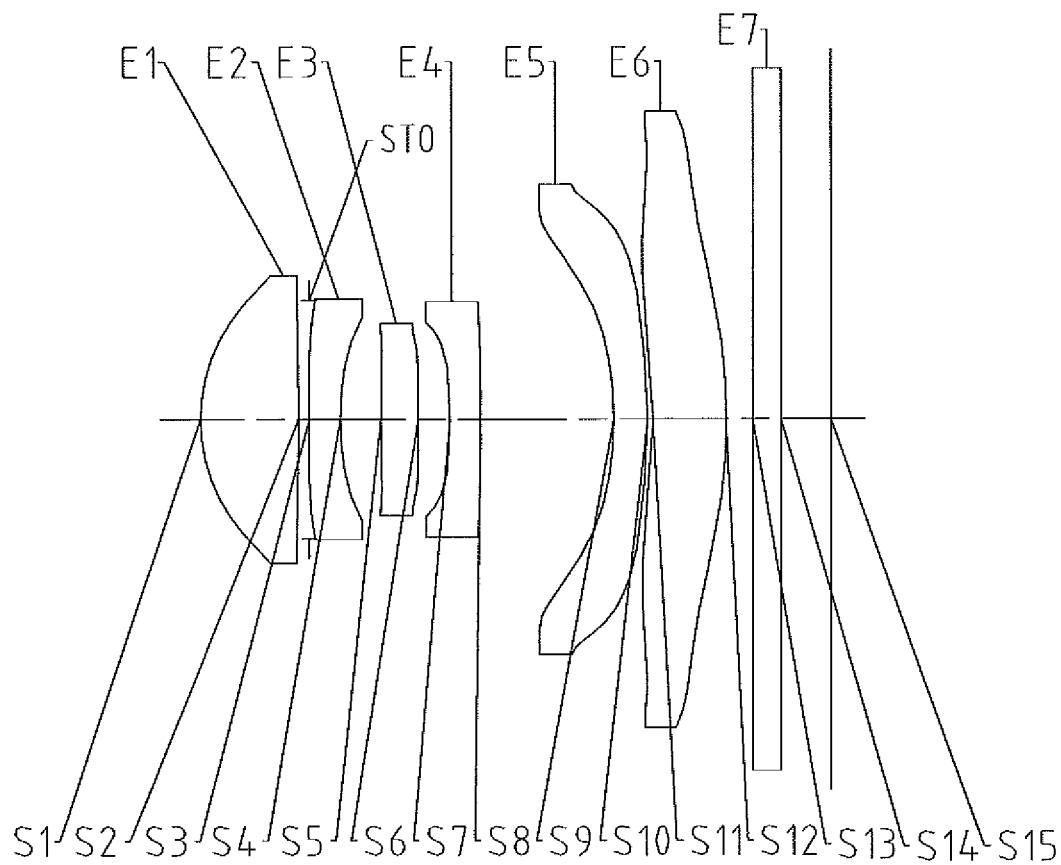
Fig.6

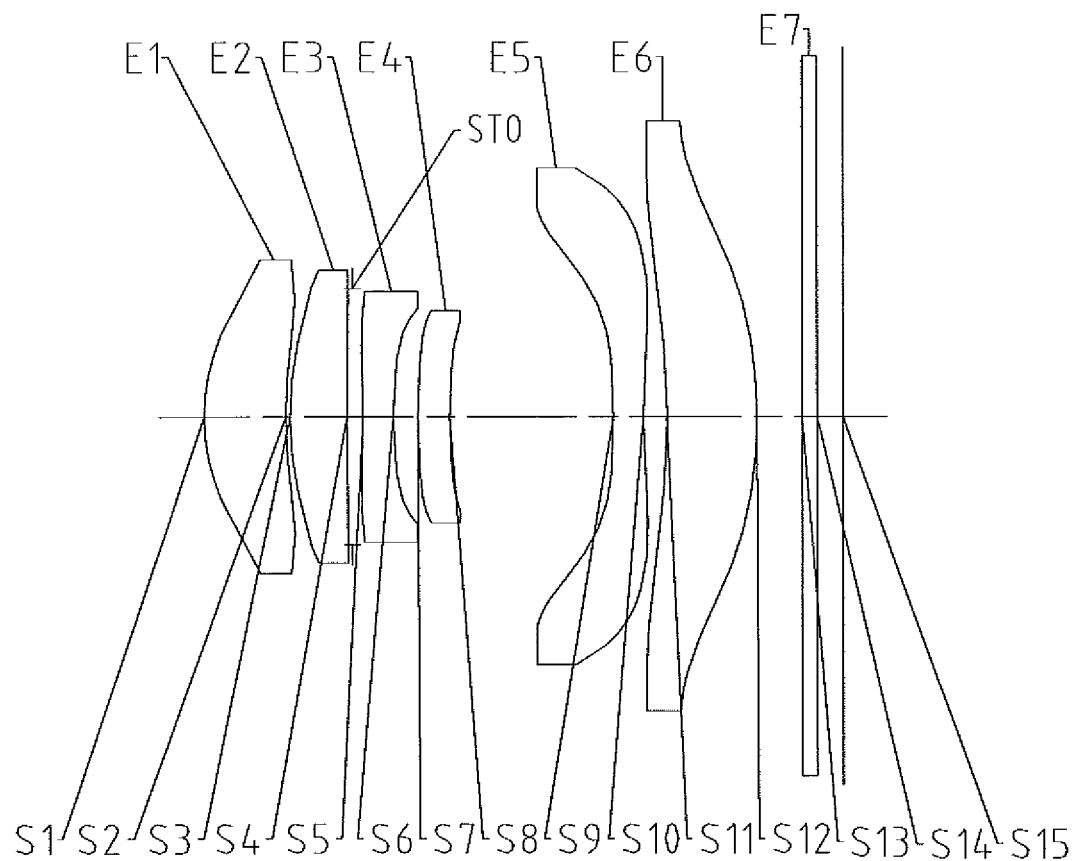
Fig.11
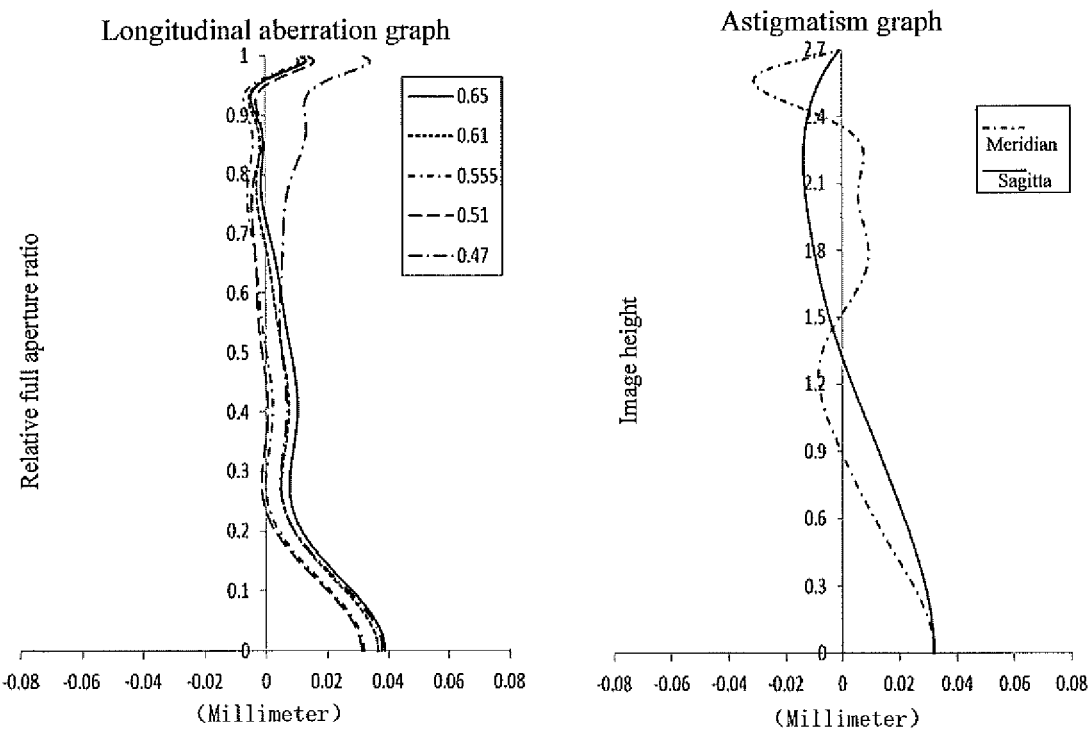
Fig.12
Fig.13

TELEPHOTO CAMERA LENS HAVING A PLURALITY OF LENSES PROVIDING TELEPHOTO PERFORMANCE

CROSS-REFERENCE TO RELATED APPLICATION

This Application is a Section 371 National Stage Application of International Application No. PCT/CN2016/083097, filed May 24, 2016 and published as WO 2017/148020 A1 on Sep. 8, 2017, not in English, which claims priority to and benefits of Chinese Patent Application Serial No. 201610118808.9, filed with the State Intellectual Property Office of P. R. China on Mar. 2, 2016, the entire contents of which are incorporated herein by reference.

FIELD

The present disclosure relates to the field of camera shooting technology, and more particularly to a miniature telephoto camera lens.

BACKGROUND

Along with performance improvement and decrease in size of a charge-coupled device (CCD) and complementary metal-oxide semiconductor (CMOS) imaging sensor, an imaging lens should correspondingly have high imaging quality and be miniaturized.

At present, people require portable electronic products with better and better camera lenses. A general camera lens can have required optical performance through increase of the number of lenses, more lenses can improve the imaging quality but go against miniaturization. In addition, in order to obtain an image having a wider viewing angle, an optical system is adopted currently, but it is not suitable for shooting through zooming in on a distant object and not conductive to obtaining a clear image.

SUMMARY

Embodiments of the present disclosure seek to solve at least one of the problems existing in the related art to at least some extent and provide a telephoto camera lens.

A telephoto camera lens sequentially includes: from an object side to an image side, a first lens with positive optical power, an object-side face of the first lens being convex;

a second lens with optical power;

a third lens with optical power;

a fourth lens with optical power;

a fifth lens with optical power, an object-side face of the fifth lens being concave; and a sixth lens with optical power, an object-side face of the sixth lens being concave near an axis, and an image-side face of the sixth lens being convex near the axis, in which the telephoto camera lens satisfies the following relation: $0.75 < TTL/f < 1.0$, and $ImgH/f < 0.55$, in which, TTL represents a distance between the object-side face of the first lens and an imaging face along the axis, f represents an effective focal length of the telephoto camera lens, and ImgH is half of a diagonal line of an effective pixel region on the imaging face.

The telephoto camera lens satisfying the above configuration has telephoto performance, a small field angle and a long focal length, and can facilitate shortening a system length of the telephoto camera lens to achieve miniaturization of the telephoto camera lens. At the same time, the telephoto camera lens can have a larger amplification factor and a higher resolution under condition of automatic focusing through cooperation with a wide-angle lens, which facilitates obtaining a clear image.

In an embodiment, the telephoto camera lens satisfies the following relation: $0.65 < |f2/f| < 1.0$, in which, f2 represents an effective focal length of the second lens.

In an embodiment, the telephoto camera lens satisfies the following relation: $-1.0 < f1/f56 < 0$, in which, f1 represents an effective focal length of the first lens, and f56 represents a combined focal length of the fifth lens and the sixth lens.

In an embodiment, the telephoto camera lens satisfies the following relation: $0 < T45/TTL < 0.3$; in which, T45 represents a distance between the fourth lens and the fifth lens along the axis.

In an embodiment, the telephoto camera lens satisfies the following relation: $0.4 < f12/f < 1.0$, and $-2.5 < f34/f < 0$, in which, f12 represents a combined focal length of the first lens and the second lens, and f34 represents a combined focal length of the third lens and the fourth lens.

In an embodiment, the telephoto camera lens satisfies the following relation: $1.0 < R2/R3 < 2.0$, in which, R2 represents a radius of curvature of an image-side face of the first lens, and R3 represents a radius of curvature of an object-side face of the second lens.

In an embodiment, the telephoto camera lens satisfies the following relation: $0 < R7/R8 < 2.0$, in which, R7 represents a radius of curvature of an object-side face of the fourth lens, and R8 represents a radius of curvature of an image-side face of the fourth lens.

In an embodiment, the telephoto camera lens satisfies the following relation: $|(R11-R12)/(R11+R12)| \leq 0.5$, and $|(R9-R12)/(R9+R12)| \leq 1.0$, in which, R9 represents a radius of curvature of the object-side face of the fifth lens, R11 represents a radius of curvature of the object-side face of the sixth lens, and R12 represents a radius of curvature of the image-side face of the sixth lens.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which:

FIG. 4 is a distortion graph (%) of the telephoto camera lens according to the first embodiment;

FIG. 5 is a graph (μm) of a lateral color curve of the telephoto camera lens according to the first embodiment;

FIG. 6 is a schematic view of a telephoto camera lens according to a second embodiment;

FIG. 11 is a schematic view of a telephoto camera lens according to a third embodiment;

FIG. 12 is a longitudinal aberration graph (mm) of the telephoto camera lens according to the third embodiment;

FIG. 13 is an astigmatism graph (mm) of the telephoto camera lens according to the third embodiment;

DETAILED DESCRIPTION

Figure 1:
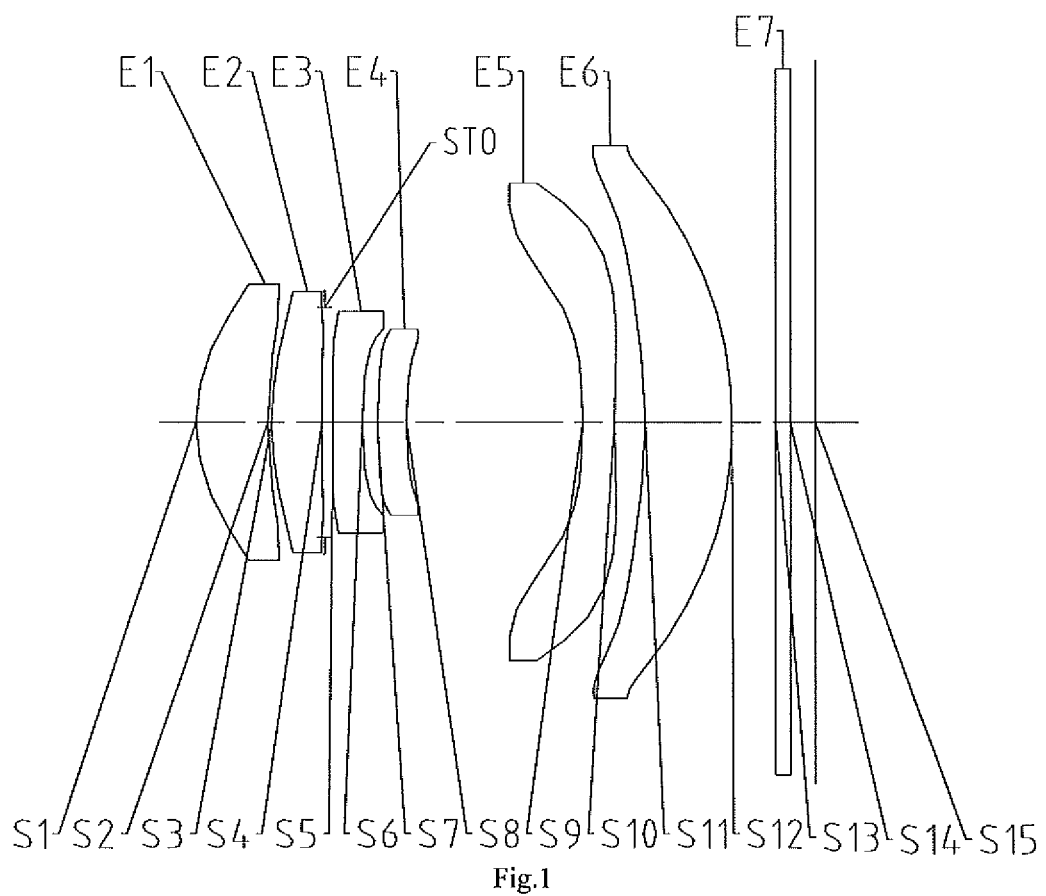
FIG. 1 is a schematic view of a telephoto camera lens according to a first embodiment.
Figure 2:
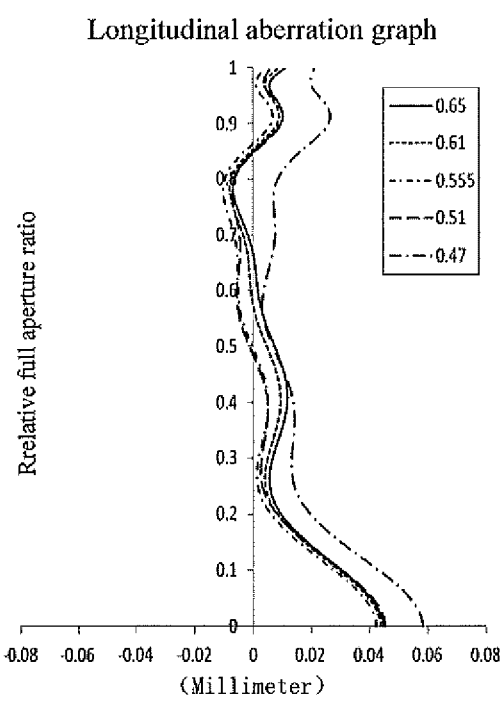
FIG. 2 is a longitudinal aberration graph (mm) of the telephoto camera lens according to the first embodiment.
Figure 3:
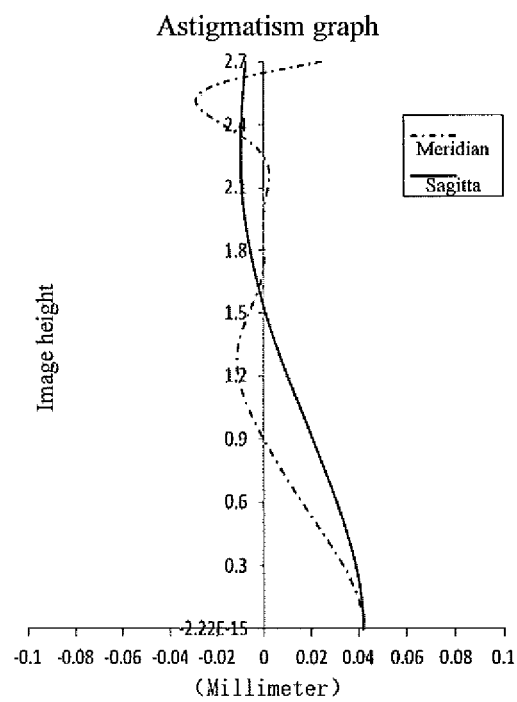
FIG. 3 is an astigmatism graph (mm) of the telephoto camera lens according to the first embodiment.
Figure 7:
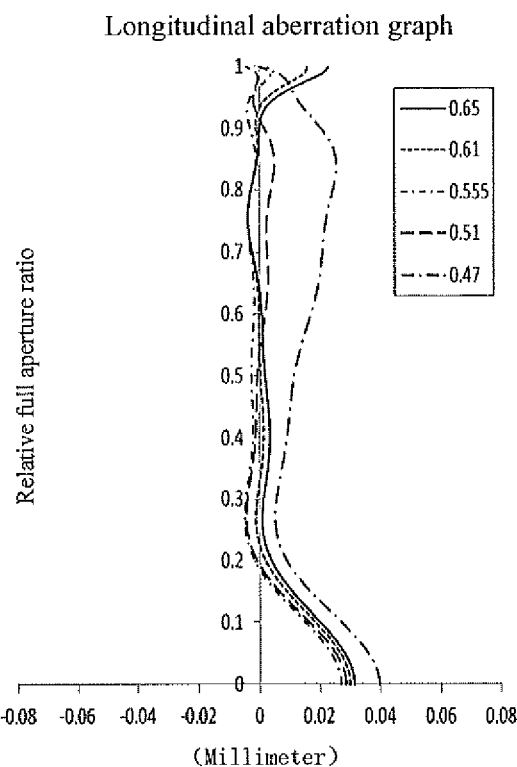
FIG. 7 is a longitudinal aberration graph (mm) of the telephoto camera lens according to the second embodiment.
Figure 8:
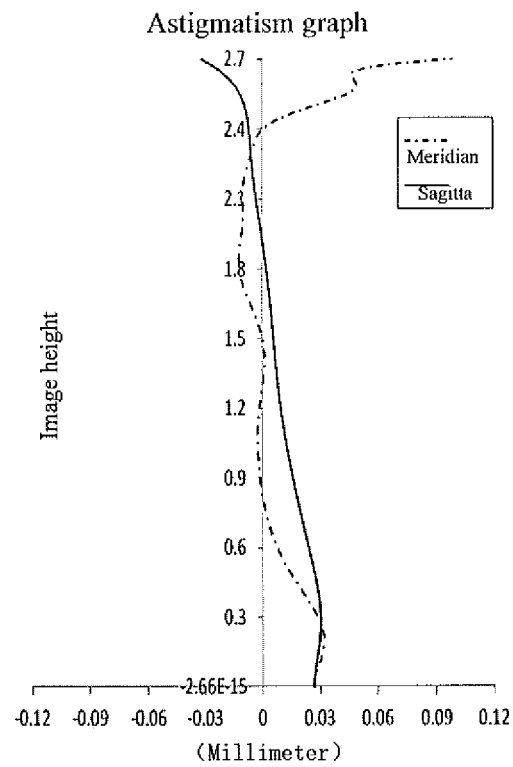
FIG. 8 is an astigmatism graph (mm) of the telephoto camera lens according to the second embodiment.
Figure 9:
FIG. 9 is a distortion graph (%) of the telephoto camera lens according to the second embodiment.
Figure 10:
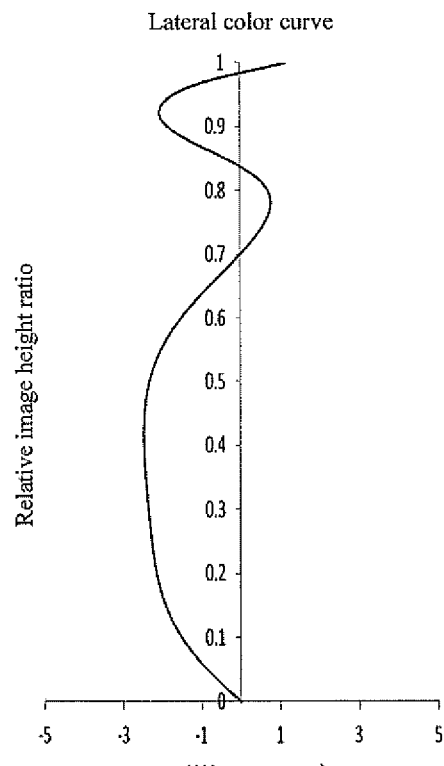
FIG. 10 is a graph (μm) of a lateral color curve of the telephoto camera lens according to the second embodiment.
Figures 14, 15:
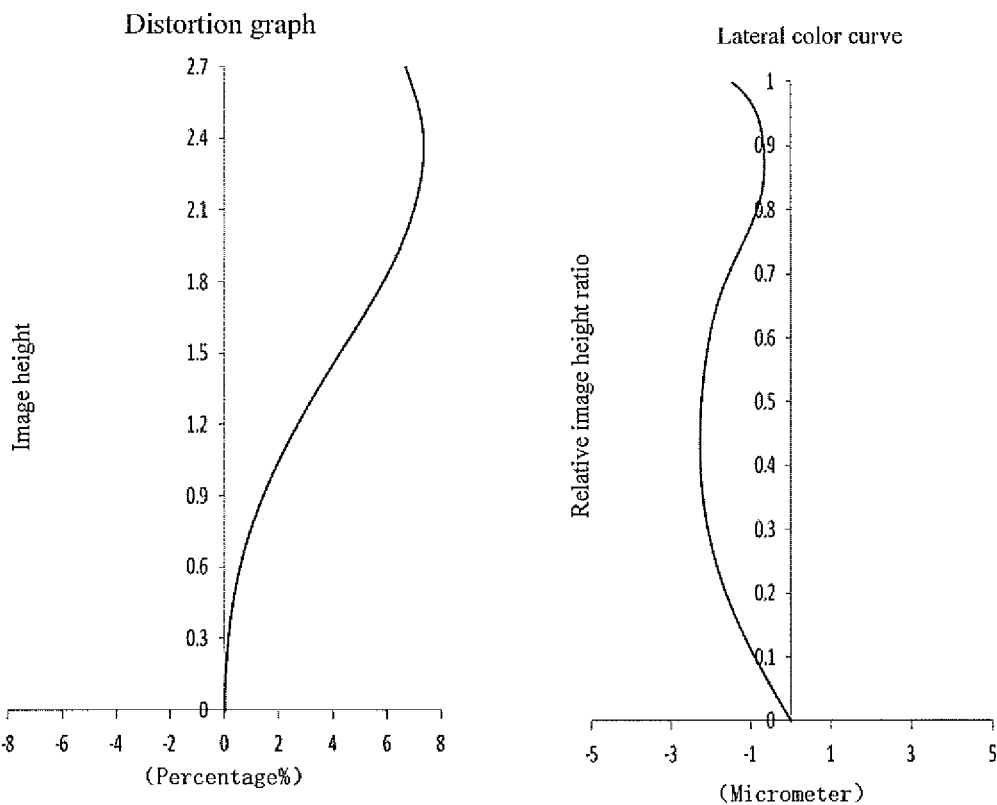
FIG. 14 is a distortion graph (%) of the telephoto camera lens according to the third embodiment.
FIG. 15 is a graph (μm) of a lateral color curve of the telephoto camera lens according to the third embodiment.
Figure 16:
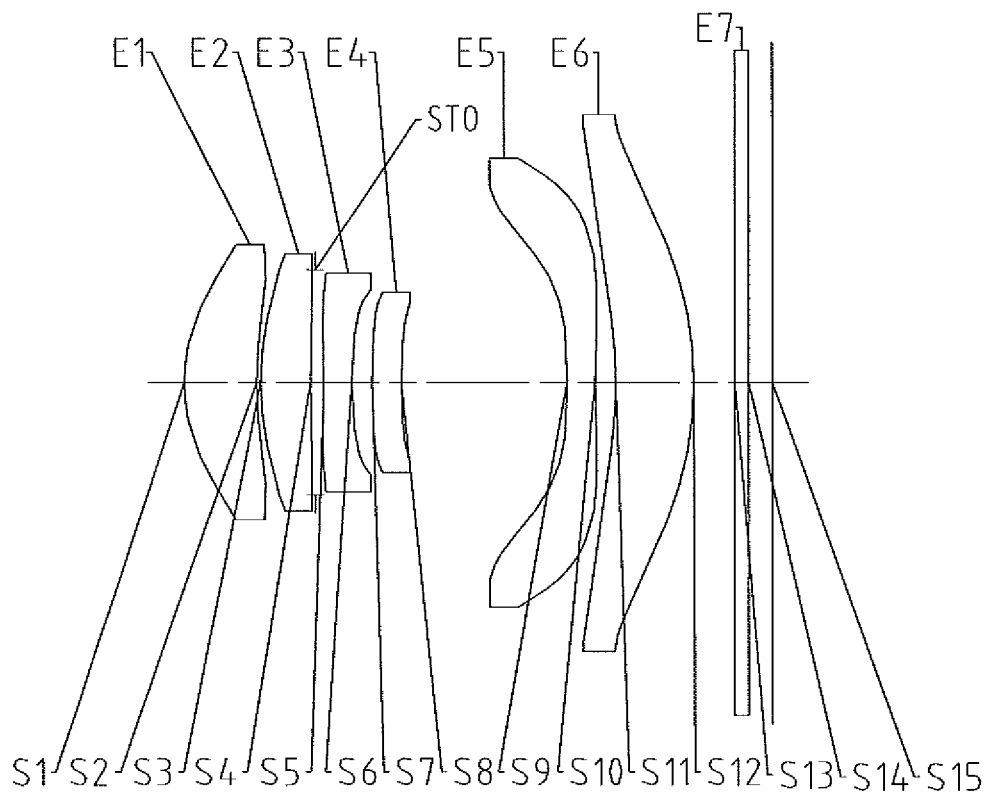
FIG. 16 is a schematic view of a telephoto camera lens according to a fourth embodiment.
Figure 17:
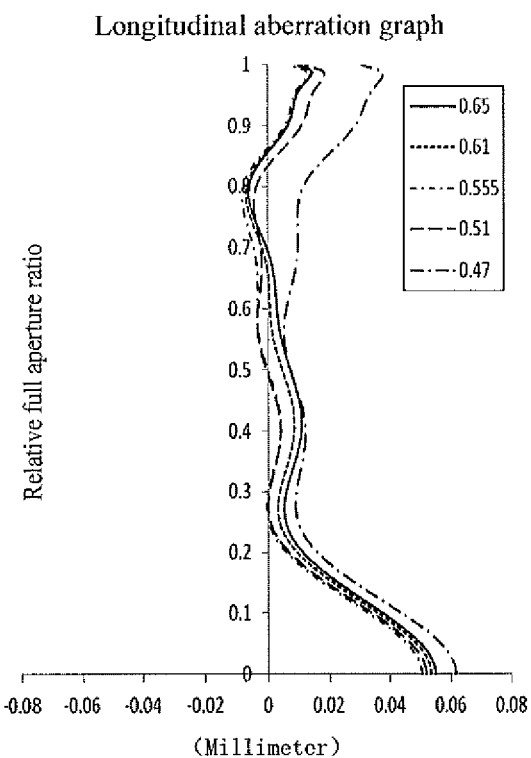
FIG. 17 is a longitudinal aberration graph (mm) of the telephoto camera lens according to the fourth embodiment.
Figure 18:
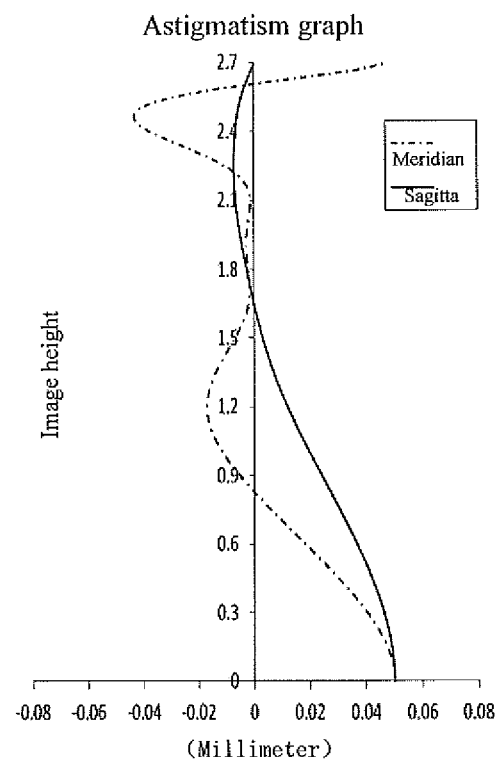
FIG. 18 is an astigmatism graph (mm) of the telephoto camera lens according to the fourth embodiment.
Figure 19:
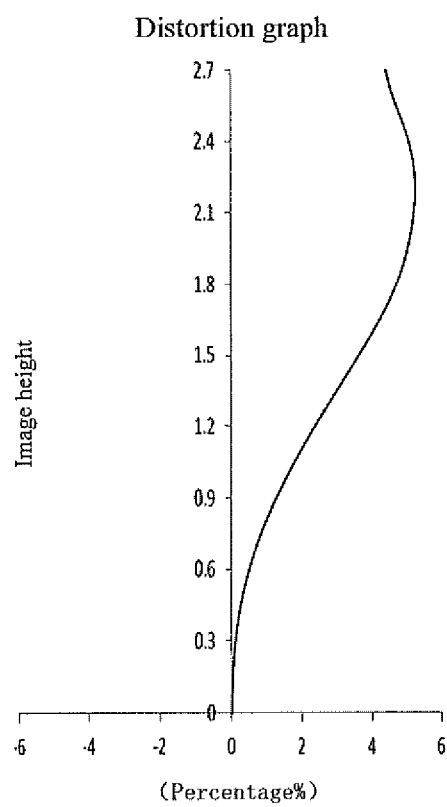
FIG. 19 is a distortion graph (%) of the telephoto camera lens according to the fourth embodiment.
Figure 20:
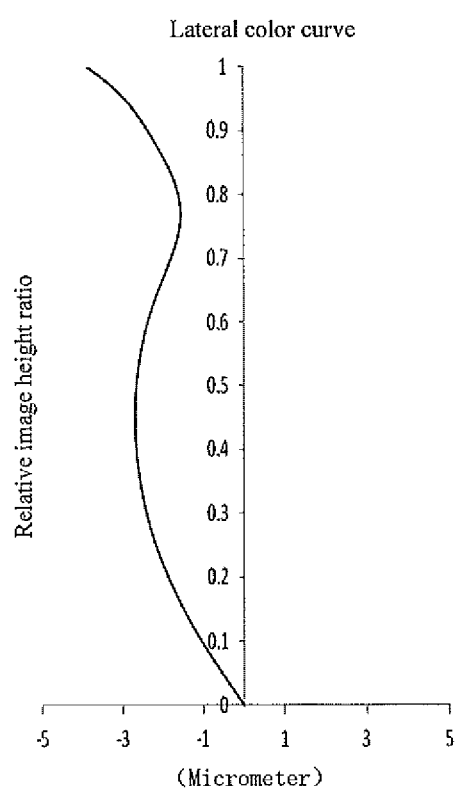
FIG. 20 is a graph (μm) of a lateral color curve of the telephoto camera lens according to the fourth embodiment.
Figure 21:
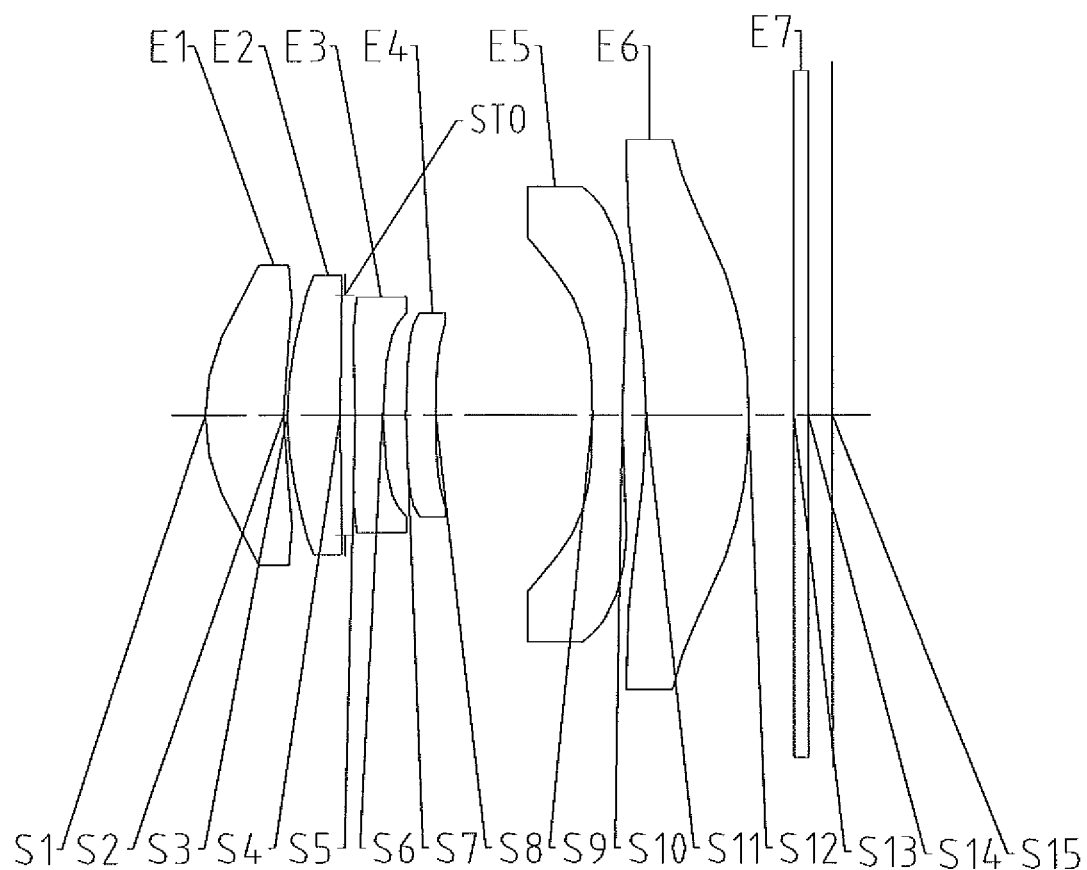
FIG. 21 is a schematic view of a telephoto camera lens according to a fifth embodiment.
Figure 22:
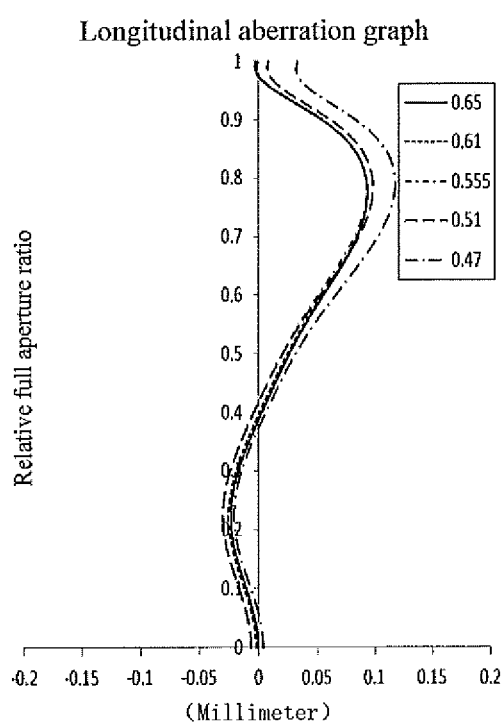
FIG. 22 is a longitudinal aberration graph (mm) of the telephoto camera lens according to the fifth embodiment.
Figure 23:
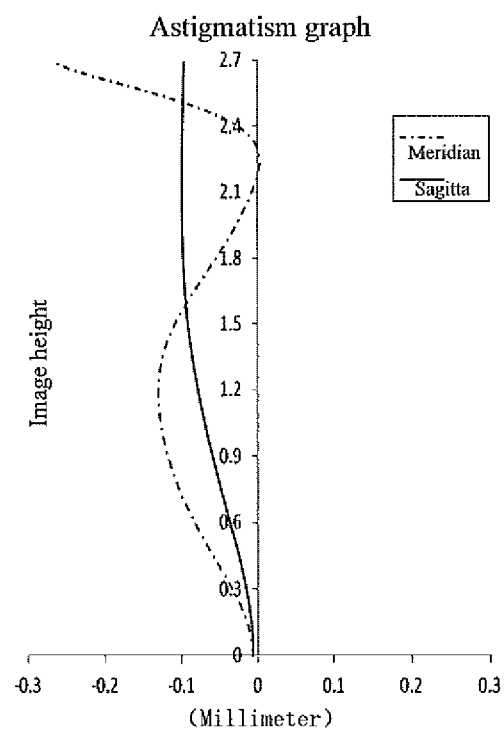
FIG. 23 is an astigmatism graph (mm) of the telephoto camera lens according to the fifth embodiment.
Figure 24:
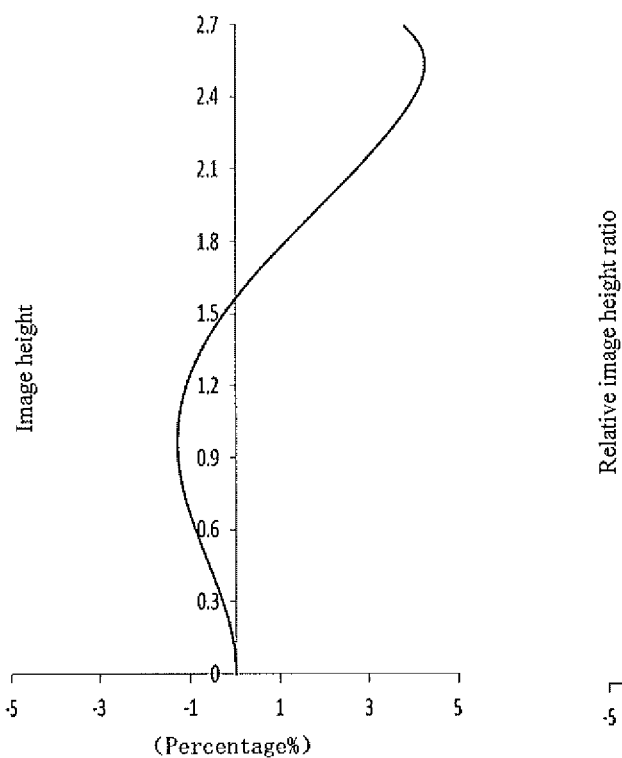
FIG. 24 is a distortion graph (%) of the telephoto camera lens according to the fifth embodiment.
Figure 25:
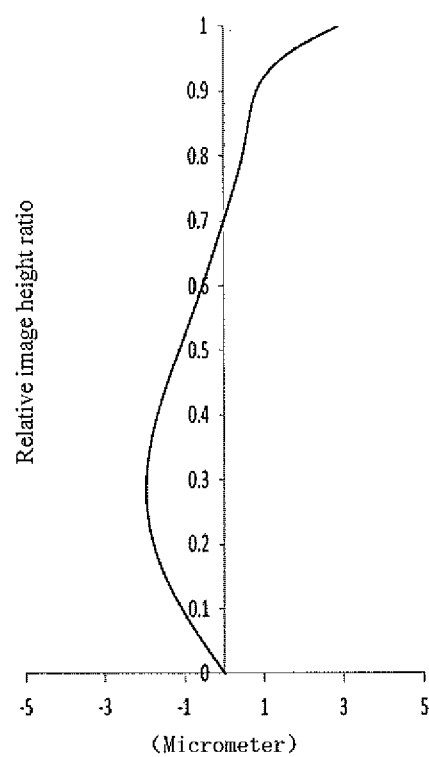
FIG. 25 is a graph (μm) of a lateral color curve of the telephoto camera lens according to the fifth embodiment.
Figure 26:
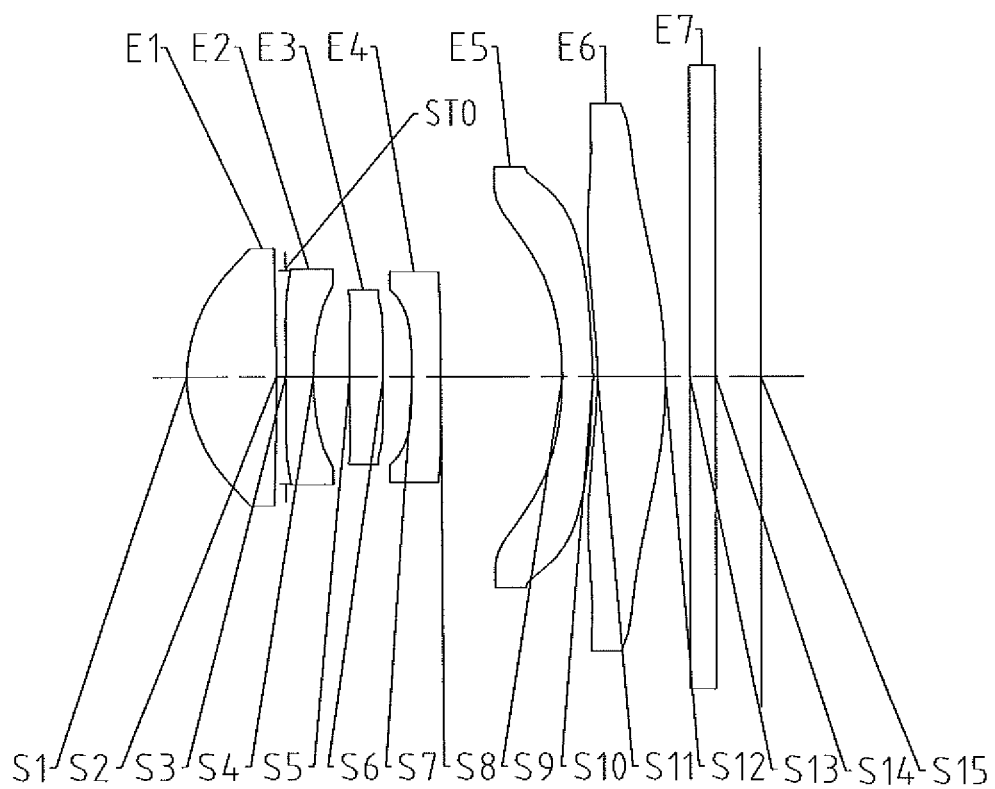
FIG. 26 is a schematic view of a telephoto camera lens according to a sixth embodiment.
Figure 27:
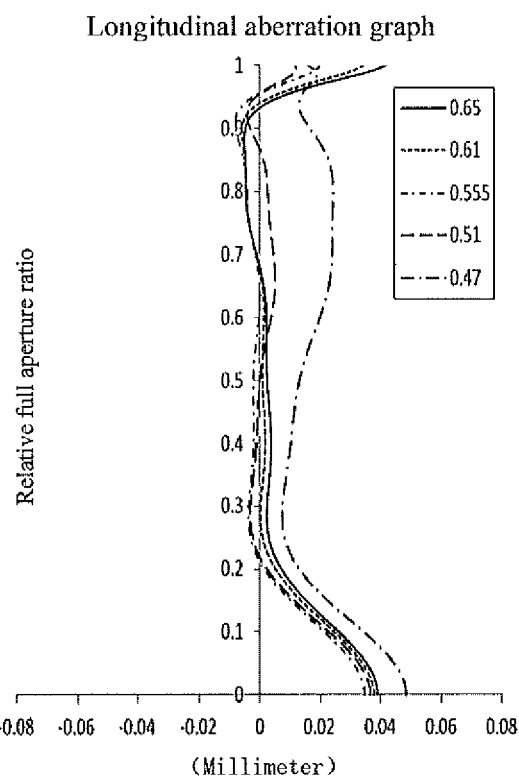
FIG. 27 is a longitudinal aberration graph (mm) of the telephoto camera lens according to the sixth embodiment.
Figure 28:
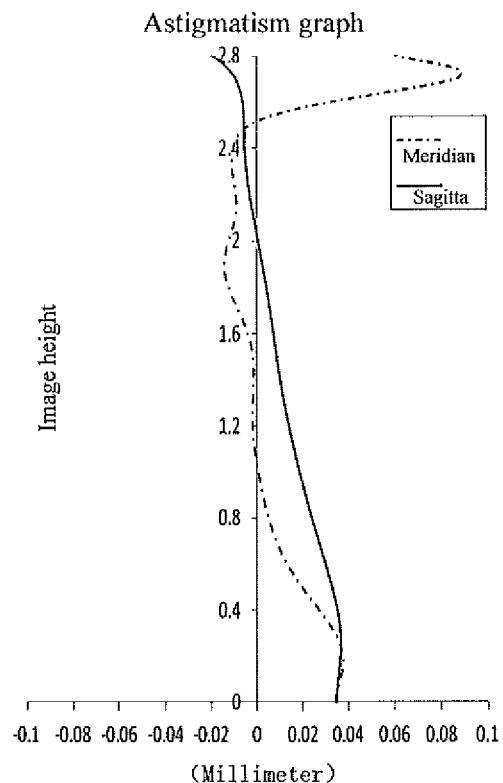
FIG. 28 is an astigmatism graph (mm) of the telephoto camera lens according to the sixth embodiment.
Figure 29:
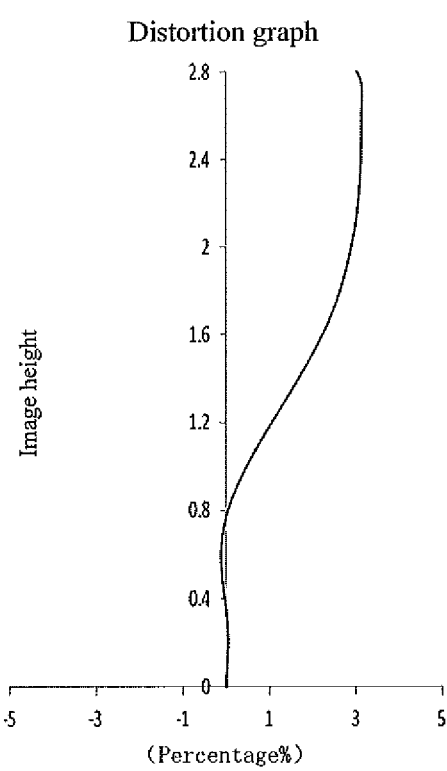
FIG. 29 is a distortion graph (%) of the telephoto camera lens according to the sixth embodiment.
Figure 30:
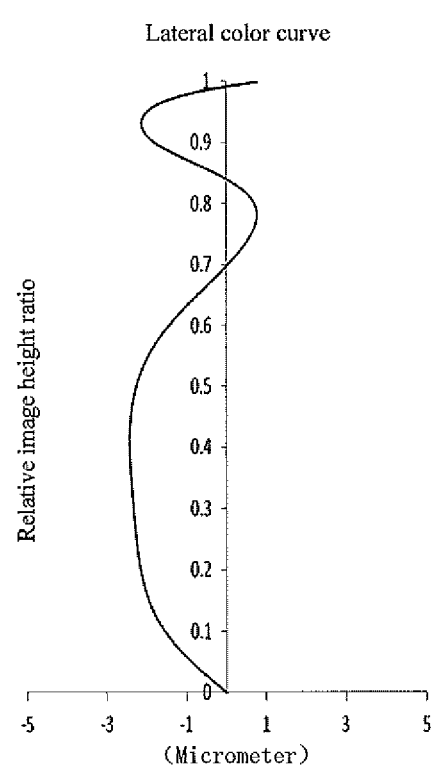
FIG. 30 is a graph (μm) of a lateral color curve of the telephoto camera lens according to the sixth embodiment.
Figure 31:
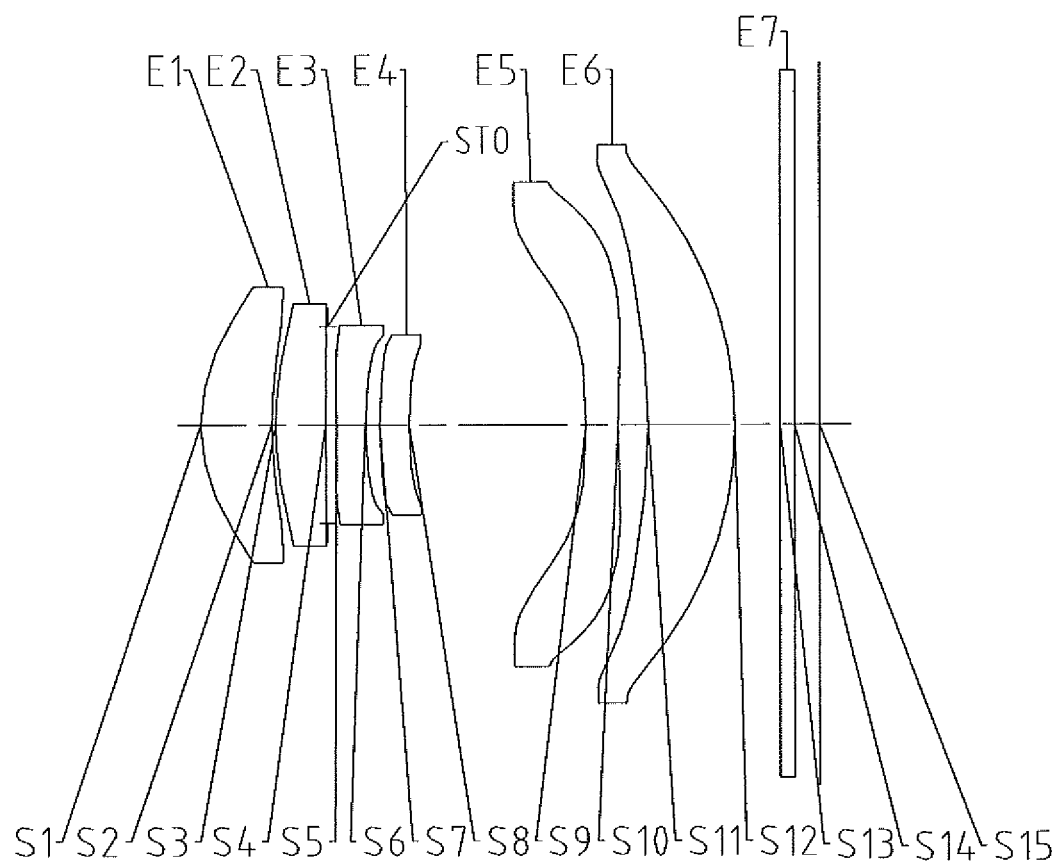
FIG. 31 is a schematic view of a telephoto camera lens according to a seventh embodiment.
Figures 32, 33:
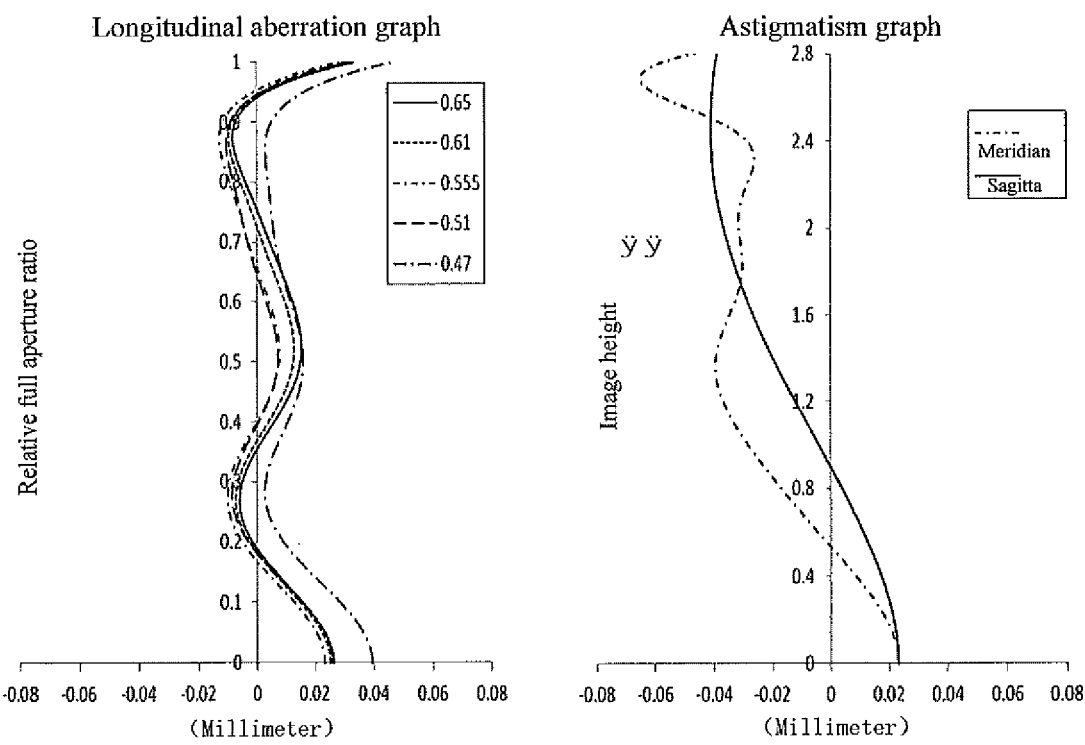
FIG. 32 is a longitudinal aberration graph (mm) of the telephoto camera lens according to the seventh embodiment.
FIG. 33 is an astigmatism graph (mm) of the telephoto camera lens according to the seventh embodiment.
Figure 34:
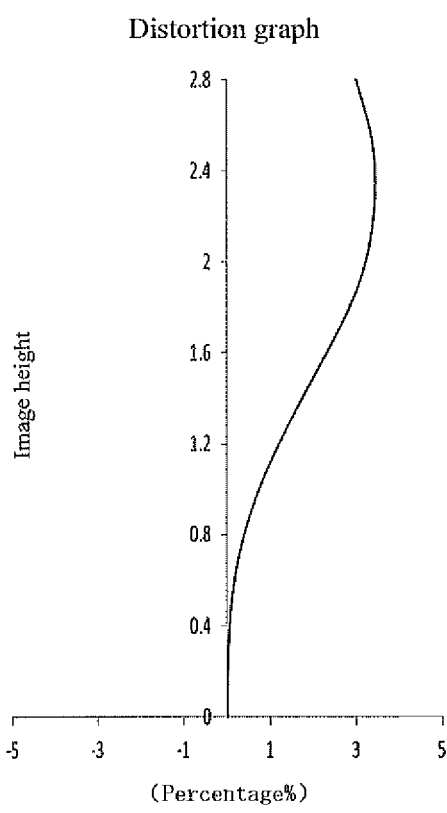
FIG. 34 is a distortion graph (%) of the telephoto camera lens according to the seventh embodiment.
Figure 35:
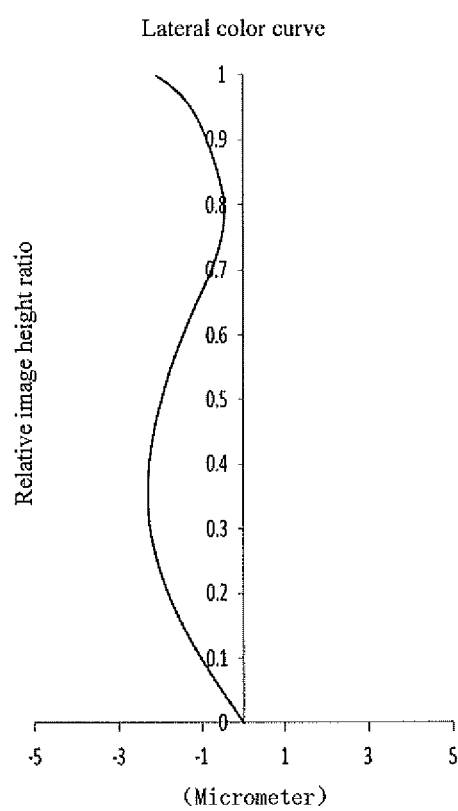
FIG. 35 is a graph (μm) of a lateral color curve of the telephoto camera lens according to the seventh embodiment.

Reference will be made in detail to embodiments of the present disclosure, examples of the embodiments are shown in the drawings. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the description of the present disclosure, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

In the present invention, unless specified or limited otherwise, the terms "mounted," "connected," "coupled," and the like are used broadly, and may be, for example, fixed connections, detachable connections, or integral connections; may also be mechanical or electrical connections; may also be direct connections or indirect connections via intervening structures; may also be inner communications or interaction of two elements, which can be understood by those skilled in the art according to specific situations.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repetition is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

Referring to FIG. 1, from an object side to an image side, a telephoto camera lens according to a preferred embodiment of the present disclosure sequentially includes:

a first lens E1 with positive optical power, an object-side face S1 of the first lens E1 being convex;

a second lens E2 with optical power;

a third lens E3 with optical power;

a fourth lens E4 with optical power;

a fifth lens E5 with optical power, an object-side face S9 of the fifth lens E5 being concave; and a sixth lens E6 with optical power, an object-side face S11 of the sixth lens E6 being concave near an axis, and an image-side face S12 of the sixth lens E6 being convex near the axis.

The telephoto camera lens satisfies the following relation: $0.75 < TTL/f < 1.0$ and $ImgH/f < 0.55$, in which, TTL represents a distance between the object-side face S1 of the first lens E1 and an imaging face S15 along the axis, f represents an effective focal length of the telephoto camera lens, and ImgH is half of a diagonal line of an effective pixel region on the imaging face S15.

The telephoto camera lens satisfying the above configuration has telephoto performance, a small field angle and a long focal length, and can facilitate shortening a system length of the telephoto camera lens to achieve miniaturization of the telephoto camera lens. Meanwhile, the telephoto camera lens, in combination with a wide-angle lens, has a larger amplification factor and a higher resolution in the case of automatic focusing, which is conductive to obtaining a clear image.

Preferably, the telephoto camera lens satisfies the following relation: 0.65<|f2/f|<1.0, in which, f2 represents an effective focal length of the second lens E2.

The telephoto camera lens satisfying the above relation can correct aberrations thereof to improve imaging quality of the telephoto camera lens.

Preferably, the telephoto camera lens satisfies the following relation: −1.0<f1/f56<0, in which, f1 represents an effective focal length of the first lens E1, and f56 represents a combined focal length of the fifth lens E5 and the sixth lens E6.

The telephoto camera lens satisfying the above relation can reduce tolerance sensitivity thereof.

Preferably, the telephoto camera lens satisfies the following relation: 0<T45/TTL<0.3, in which, T45 represents a distance between the fourth lens E4 and the fifth lens E5 along the axis.

The telephoto camera lens satisfying the above relation can further ensure miniaturization of the telephoto camera lens and meet size requirements of telephoto camera lens for portable electronic products.

Preferably, the telephoto camera lens satisfies the following relation: 0.4<f12/f<1.0 and −2.5<f34/f<0, in which, f12 represents a combined focal length of the first lens E1 and the second lens E2, and f34 represents a combined focal length of the third lens E3 and the fourth lens E4.

The telephoto camera lens satisfying the above relation can correct various aberrations and improve resolution of the telephoto camera lens.

Preferably, the telephoto camera lens satisfies the following relation: 1.0<R2/R3<2.0, in which, R2 represents a radius of curvature of an image-side face S2 of the first lens E1, and R3 represents a radius of curvature of an object-side face S3 of the second lens E2.

The telephoto camera lens satisfying the above relation can facilitate assembling and further improve the production efficiency thereof.

Preferably, the telephoto camera lens satisfies the following relation: 0<R7/R8<2.0, in which, R7 represents a radius of curvature of an object-side face S7 of the fourth lens E4, and R8 represents a radius of curvature of an image-side face S8 of the fourth lens E4.

The telephoto camera lens satisfying the above relation can reduce an angle of incidence of light, and have a small field angle and a higher chip matching rate.

Preferably, the telephoto camera lens satisfies the following relation: |(R11−R12)/(R11+R12)|≤0.5, and |(R9−R12)/(R9+R12)|≤1.0, in which, R9 represents a radius of curvature of the object-side face S9 of the fifth lens E5, R11 represents a radius of curvature of the object-side face S11 of the sixth lens E6, and R12 represents a radius of curvature of the image-side face S12 of the sixth lens E6.

The telephoto camera lens satisfying the above relation can correct margin aberrations, make the lenses uniform in thickness, and make the whole image quality uniform from the center to the margin.

During formation of an image, light penetrates six lenses, passes an optical filter E7 having an object-side surface S13 and an image-side surface S14, and forms an image on the imaging face S15.

In some embodiments, the first lens E1, the second lens E2, the third lens E3, the forth lens E4, the fifth lens E5 and the sixth lens E6 are all configured as aspherical lenses.

A surface shape of an aspherical surface is determined based on the following formula:

$$x = \frac{ch^2}{1+\sqrt{1-(k+1)c^2h^2}} + \sum A_i h^i,$$

in which, h represents a height from any point on the aspheric surface to an optical axis, c represents a curvature of an apex, k is a conic constant, and Ai represents a correction factor of an i-th order of the aspherical surface.

The First Embodiment

Referring to FIG. 1 to FIG. 5, a telephoto camera lens according to the first embodiment satisfies conditions in table 1 to table 3.

TABLE 1

| Face numeral | Type of surface | Radius of curvature | Thickness | Material | Conic constant |
|---|---|---|---|---|---|
| OBJ | spherical surface | infinity | infinity | — | — |
| S1 | aspheric surface | 1.3683 | 0.5427 | 1.544/56.11 | 0.1346 |
| S2 | aspheric surface | 3.1548 | 0.0300 | — | 1.4580 |
| S3 | aspheric surface | 2.4634 | 0.3793 | 1.544/56.11 | −3.3809 |
| S4 | aspheric surface | −96.5945 | 0.0192 | — | −73.5631 |
| STO | spherical surface | infinity | 0.0638 | — | — |
| S5 | aspheric surface | −8.0667 | 0.2200 | 1.651/21.52 | 3.8953 |
| S6 | aspheric surface | 2.9416 | 0.1128 | — | −10.4022 |
| S7 | aspheric surface | 3.4352 | 0.2200 | 1.651/21.52 | −42.4558 |
| S8 | aspheric surface | 3.1394 | 1.3362 | — | −98.9363 |
| S9 | aspheric surface | −5.8110 | 0.2400 | 1.544/56.11 | 9.0067 |
| S10 | aspheric surface | 7.7560 | 0.2325 | — | −31.6835 |
| S11 | aspheric surface | −3.9336 | 0.6544 | 1.651/21.52 | −19.0834 |
| S12 | aspheric surface | −3.4461 | 0.3308 | — | −0.3727 |
| S13 | spherical surface | infinity | 0.1100 | 1.517/64.17 | — |
| S14 | spherical surface | infinity | 0.1892 | — | — |
| S15 | spherical surface | infinity | — | — | — |

TABLE 2

| Face numeral | A4 | A6 | A8 | A10 | A12 | A14 | A16 |
|---|---|---|---|---|---|---|---|
| S1 | −1.1469E−02 | −7.5937E−02 | 2.1962E−01 | −5.3219E−01 | 6.9096E−01 | −4.9782E−01 | 1.3566E−01 |
| S2 | −1.1258E−01 | 1.7827E−01 | 3.3188E−01 | −1.9239E+00 | 2.5849E+00 | −1.4283E+00 | 2.8677E−01 |
| S3 | −8.1079E−02 | 2.2744E−01 | 5.3634E−01 | −2.7903E+00 | 3.3133E+00 | −1.2753E+00 | 5.1346E−02 |
| S4 | 8.5660E−02 | 7.0994E−01 | −3.6454E+00 | 6.4955E+00 | −6.1725E+00 | 3.4997E+00 | −9.9934E−01 |
| S5 | 1.7467E−01 | 1.0492E+00 | −7.2480E+00 | 2.2569E+01 | −3.7665E+01 | 3.2910E+01 | −1.1990E+01 |
| S6 | −1.7896E−01 | 2.0380E+00 | −1.2102E+01 | 5.2392E+01 | −1.1325E+02 | 1.3180E+02 | −6.8104E+01 |
| S7 | −2.2592E−01 | 1.2647E+00 | −6.3394E+00 | 3.2150E+01 | −7.5985E+01 | 8.7472E+01 | −4.0109E+01 |
| S8 | 4.0234E−01 | −6.8752E−01 | 8.3923E−01 | 1.0318E+01 | −4.4151E+01 | 7.0361E+01 | −4.0590E+01 |
| S9 | −1.4451E−01 | −8.4644E−02 | 1.7381E−01 | −1.3264E−01 | 6.6669E−02 | −1.8388E−02 | 2.0133E−03 |
| S10 | −4.2736E−02 | −1.0263E−01 | 1.4719E−01 | −1.0569E−01 | 4.2476E−02 | −9.2568E−03 | 8.4517E−04 |
| S11 | 1.3538E−02 | −4.1843E−03 | −7.9928E−04 | −9.4657E−05 | 1.6254E−05 | 5.8510E−06 | 1.5669E−06 |
| S12 | −3.6677E−02 | 1.4138E−02 | −1.4882E−03 | −2.0809E−04 | −2.7052E−05 | 3.0608E−06 | 2.8186E−06 |

TABLE 3

| | | | |
|---|---|---|---|
| f1(mm) | 4.00 | f(mm) | 5.30 |
| f2(mm) | 4.41 | Fno | 2.26 |
| f3(mm) | −3.26 | TTL(mm) | 4.68 |
| f4(mm) | −78.78 | HFOV(deg) | 26.66 |
| f5(mm) | −6.05 | | |
| f6(mm) | 27.66 | | |

The Second Embodiment

Referring to FIG. 6 to FIG. 10, a telephoto camera lens according to the second embodiment satisfies conditions in table 4 to table 6.

TABLE 4

| Face numeral | Type of surface | Radius of curvature | Thickness | Material | Conic constant |
|---|---|---|---|---|---|
| OBJ | spherical surface | infinity | infinity | — | — |
| S1 | aspheric surface | 1.2507 | 0.7331 | 1.544/56.11 | −0.0694 |
| S2 | aspheric surface | −18.2976 | 0.0777 | — | −57.6376 |
| STO | spherical surface | infinity | 0.0000 | — | — |
| S3 | aspheric surface | −11.6363 | 0.2300 | 1.651/21.52 | −51.8429 |
| S4 | aspheric surface | 3.3249 | 0.3000 | — | −98.9969 |
| S5 | aspheric surface | −100.0933 | 0.2756 | 1.544/56.11 | −81.1740 |
| S6 | aspheric surface | −76.3272 | 0.2406 | — | 6.7203 |
| S7 | aspheric surface | −5.6966 | 0.2300 | 1.544/56.11 | 19.4373 |
| S8 | aspheric surface | −314.7117 | 0.9854 | — | −99.0000 |
| S9 | aspheric surface | −2.3080 | 0.2500 | 1.544/56.11 | −10.3171 |
| S10 | aspheric surface | −2.2039 | 0.0384 | — | −98.9731 |
| S11 | aspheric surface | −2.4181 | 0.5408 | 1.651/21.52 | −99.0000 |
| S12 | aspheric surface | −5.9426 | 0.2000 | — | −1.9328 |
| S13 | spherical surface | infinity | 0.2100 | 1.517/64.17 | — |
| S14 | spherical surface | infinity | 0.3692 | — | — |
| S15 | spherical surface | infinity | — | — | — |

TABLE 5

| Face numeral | A4 | A6 | A8 | A10 | A12 | A14 | A16 |
|---|---|---|---|---|---|---|---|
| S1 | 2.6514E−03 | −6.4261E−02 | 2.4049E−01 | −5.7408E−01 | 7.4043E−01 | −5.1996E−01 | 1.4390E−01 |
| S2 | 1.6229E−01 | −6.0696E−01 | 1.1532E+00 | −1.3180E+00 | 8.6497E−01 | −2.6112E−01 | 1.4926E−02 |
| S3 | 3.9687E−01 | −1.3342E+00 | 2.9490E+00 | −4.0218E+00 | 3.3150E+00 | −1.2323E+00 | 2.4506E−02 |
| S4 | 7.2420E−01 | −1.8627E+00 | 3.2548E+00 | 3.2218E+00 | −2.8445E+01 | 5.5430E+01 | −3.7932E+01 |
| S5 | 1.8240E−01 | −4.2750E−01 | −1.5949E+00 | 1.6011E+01 | −5.8408E+01 | 1.0332E+02 | −7.4230E+01 |
| S6 | 1.6124E−02 | −4.0435E−01 | −2.2527E+00 | 1.3665E+01 | −3.8166E+01 | 5.4849E+01 | −3.4071E+01 |
| S7 | −1.3345E−01 | −9.6284E−01 | 8.0902E−01 | 1.1915E+00 | −1.1961E+01 | 3.0047E+01 | −2.5993E+01 |
| S8 | 1.8427E−02 | −3.9078E−01 | 4.1872E−01 | 2.4895E−01 | −2.3220E−01 | −1.9203E−01 | 1.1825E−01 |
| S9 | 5.1725E−02 | −4.0297E−01 | 5.3111E−01 | −3.7597E−01 | 1.4668E−01 | −2.7762E−02 | 1.8659E−03 |
| S10 | 1.6200E−01 | −4.7849E−01 | 5.8304E−01 | −4.1192E−01 | 1.7059E−01 | −3.8831E−02 | 3.7321E−03 |
| S11 | −4.9187E−02 | 1.0719E−01 | −8.4908E−02 | 3.8234E−02 | −9.9845E−03 | 1.3845E−03 | −7.8447E−05 |
| S12 | −1.0902E−01 | 1.5129E−01 | −1.0623E−01 | 4.3685E−02 | −1.0205E−02 | 1.2457E−03 | −6.1752E−05 |

TABLE 6

| f1(mm) | 2.17 | f(mm) | 5.25 |
|---|---|---|---|
| f2(mm) | −3.92 | Fno | 2.26 |
| f3(mm) | 586.41 | TTL(mm) | 4.68 |
| f4(mm) | −10.63 | HFOV(deg) | 26.82 |
| f5(mm) | 48.44 | | |
| f6(mm) | −6.61 | | |

The Third Embodiment

Referring to FIG. 11 to FIG. 15, a telephoto camera lens according to the third embodiment satisfies conditions in table 7 to table 9.

TABLE 7

| Face numeral | Type of surface | Radius of curvature | Thickness | Material | Conic constant |
|---|---|---|---|---|---|
| OBJ | spherical surface | infinity | infinity | — | — |
| S1 | aspheric surface | 1.4803 | 0.6007 | 1.544/56.11 | 0.2249 |
| S2 | aspheric surface | 3.6063 | 0.0300 | — | 0.9060 |
| S3 | aspheric surface | 2.5361 | 0.4138 | 1.544/56.11 | −2.3425 |
| S4 | aspheric surface | −91.7260 | 0.0393 | — | −73.5631 |
| STO | spherical surface | infinity | 0.0787 | — | — |
| S5 | aspheric surface | −5.6682 | 0.2200 | 1.651/21.52 | 3.8953 |
| S6 | aspheric surface | 3.3211 | 0.1820 | — | −10.4022 |
| S7 | aspheric surface | 4.7464 | 0.2394 | 1.651/21.52 | −42.4558 |
| S8 | aspheric surface | 6.2679 | 1.2021 | — | −98.9363 |
| S9 | aspheric surface | −9.3373 | 0.2200 | 1.544/56.11 | 22.3301 |
| S10 | aspheric surface | 5.0764 | 0.1768 | — | −31.6835 |
| S11 | aspheric surface | −4.6380 | 0.6482 | 1.651/21.52 | −28.8232 |
| S12 | aspheric surface | −4.2452 | 0.3308 | — | −2.0754 |
| S13 | spherical surface | infinity | 0.1100 | 1.517/64.17 | — |
| S14 | spherical surface | infinity | 0.1892 | — | — |
| S15 | spherical surface | infinity | — | — | — |

TABLE 8

| Face numeral | A4 | A6 | A8 | A10 | A12 | A14 | A16 |
|---|---|---|---|---|---|---|---|
| S1 | −1.4143E−02 | −5.9744E−02 | 1.4002E−01 | −3.1357E−01 | 3.6254E−01 | −2.3517E−01 | 5.9057E−02 |
| S2 | −2.9228E−02 | −2.8728E−01 | 1.0566E+00 | −2.0159E+00 | 1.9522E+00 | −9.4720E−01 | 1.8648E−01 |
| S3 | 1.0861E−02 | −2.9759E−01 | 1.2297E+00 | −2.2804E+00 | 2.0119E+00 | −8.1476E−01 | 1.2404E−01 |
| S4 | 8.6866E−02 | 1.9960E−02 | −3.4133E−01 | 7.7217E−01 | −1.2140E+00 | 1.0161E+00 | −3.2575E−01 |
| S5 | 1.8403E−01 | 9.6861E−04 | −9.8330E−01 | 3.5935E+00 | −5.6842E+00 | 4.2841E+00 | −1.2966E+00 |
| S6 | 4.2255E−02 | 3.8988E−01 | −2.2929E+00 | 9.3146E+00 | −1.6720E+01 | 1.6679E+01 | −7.6297E+00 |
| S7 | −7.0077E−02 | 2.5920E−01 | −5.3444E−01 | 2.3203E+00 | −2.2048E+00 | −6.2734E−01 | 1.2936E+00 |
| S8 | 8.2985E−02 | 3.9158E−01 | −1.9073E+00 | 7.4619E+00 | −1.4526E+01 | 1.4352E+01 | −5.6835E+00 |
| S9 | −1.6324E−01 | −5.9432E−02 | 1.3910E−01 | −1.2480E−01 | 7.0662E−02 | −1.9811E−02 | 2.0568E−03 |
| S10 | −2.7776E−02 | −9.1753E−02 | 1.2163E−01 | −8.2117E−02 | 3.1194E−02 | −6.4069E−03 | 5.4369E−04 |
| S11 | 5.8490E−03 | −1.6359E−04 | −2.1769E−05 | 7.7602E−06 | 3.6847E−06 | 2.4209E−07 | −1.9787E−07 |
| S12 | −4.7607E−02 | 1.3342E−02 | −5.5268E−04 | −1.8737E−05 | −5.6435E−06 | −4.6981E−07 | 1.1878E−07 |

TABLE 9

| f1(mm) | 4.18 | f(mm) | 5.08 |
|---|---|---|---|
| f2(mm) | 4.53 | Fno | 1.94 |
| f3(mm) | −3.16 | TTL(mm) | 4.68 |
| f4(mm) | 28.04 | HFOV(deg) | 26.73 |
| f5(mm) | −5.99 | | |
| f6(mm) | 46.18 | | |

The Fourth Embodiment

Referring to FIG. 16 to FIG. 20, a telephoto camera lens according to the fourth embodiment satisfies conditions in table 10 to table 12.

TABLE 10

| Face numeral | Type of surface | Radius of curvature | Thickness | Material | Conic constant |
|---|---|---|---|---|---|
| OBJ | spherical surface | infinity | infinity | — | — |
| S1 | aspheric surface | 1.4459 | 0.5746 | 1.544/56.11 | 0.2037 |

TABLE 10-continued

| Face numeral | Type of surface | Radius of curvature | Thickness | Material | Conic constant |
| --- | --- | --- | --- | --- | --- |
| S2 | aspheric surface | 3.4345 | 0.0300 | — | 1.0611 |
| S3 | aspheric surface | 2.4122 | 0.3963 | 1.544/56.11 | −2.4001 |
| S4 | aspheric surface | 241.6288 | 0.0346 | — | −73.5631 |
| STO | spherical surface | infinity | 0.0697 | — | — |
| S5 | aspheric surface | −6.0819 | 0.2200 | 1.651/21.52 | 3.8953 |
| S6 | aspheric surface | 3.3820 | 0.1616 | — | −10.4022 |
| S7 | aspheric surface | 4.7607 | 0.2353 | 1.651/21.52 | −42.4558 |
| S8 | aspheric surface | 4.8392 | 1.3215 | — | −98.9363 |
| S9 | aspheric surface | −8.4218 | 0.2200 | 1.544/56.11 | 22.3301 |
| S10 | aspheric surface | 6.3295 | 0.1666 | — | −31.6835 |
| S11 | aspheric surface | −3.3419 | 0.6209 | 1.651/21.52 | −20.1273 |
| S12 | aspheric surface | −3.2597 | 0.3308 | — | −2.1334 |
| S13 | spherical surface | infinity | 0.1100 | 1.517/64.17 | — |
| S14 | spherical surface | infinity | 0.1892 | — | — |
| S15 | spherical surface | infinity | — | — | — |

TABLE 11

| Face numeral | A4 | A6 | A8 | A10 | A12 | A14 | A16 |
| --- | --- | --- | --- | --- | --- | --- | --- |
| S1 | −9.2988E−03 | −7.8595E−02 | 1.9151E−01 | −4.1615E−01 | 4.9805E−01 | −3.3551E−01 | 8.7401E−02 |
| S2 | −4.9711E−02 | −2.2913E−01 | 1.1661E+00 | −2.5975E+00 | 2.7686E+00 | −1.4456E+00 | 3.0267E−01 |
| S3 | −1.6433E−02 | −2.0929E−01 | 1.4166E+00 | −3.2379E+00 | 3.1943E+00 | −1.3604E+00 | 1.9728E−01 |
| S4 | 5.0344E−02 | 4.9888E−01 | −1.8915E+00 | 2.7181E+00 | −2.2368E+00 | 1.2511E+00 | −3.9093E−01 |
| S5 | 1.3330E−01 | 7.8259E−01 | −4.7172E+00 | 1.2983E+01 | −1.9230E+01 | 1.5032E+01 | −4.9768E+00 |
| S6 | −5.5697E−02 | 1.3782E+00 | −8.5678E+00 | 3.4510E+01 | −7.2900E+01 | 8.5120E+01 | −4.3442E+01 |
| S7 | −1.3963E−01 | 7.3300E−01 | −2.8555E+00 | 1.2479E+01 | −2.5044E+01 | 2.4843E+01 | −1.0003E+01 |
| S8 | 1.1833E−01 | 7.4930E−01 | −5.7271E+00 | 2.9121E+01 | −7.7469E+01 | 1.0627E+02 | −5.9197E+01 |
| S9 | −2.0179E−01 | −3.9323E−03 | 6.4525E−02 | −5.5435E−02 | 3.5518E−02 | −1.0954E−02 | 1.1936E−03 |
| S10 | −5.7301E−02 | −8.2599E−02 | 1.3190E−01 | −9.8636E−02 | 4.0904E−02 | −9.2040E−03 | 8.6269E−04 |
| S11 | 1.3239E−01 | −1.7662E−03 | −3.9085E−04 | −4.8748E−05 | 1.5838E−05 | 2.5938E−06 | 3.3300E−08 |
| S12 | −3.5111E−02 | 1.2929E−02 | −9.5333E−04 | −7.3480E−05 | −1.4066E−05 | 6.9502E−07 | 8.4716E−07 |

TABLE 12

| f1(mm) | 4.15 | f(mm) | 5.22 |
| --- | --- | --- | --- |
| f2(mm) | 4.46 | Fno | 2.10 |
| f3(mm) | −3.28 | TTL(mm) | 4.68 |
| f4(mm) | 204.46 | HFOV(deg) | 26.73 |
| f5(mm) | −6.58 | | |
| f6(mm) | 50.56 | | |

The Fifth Embodiment

Referring to FIG. 21 to FIG. 25, a telephoto camera lens according to the fifth embodiment satisfies conditions in table 13 to table 15.

TABLE 13

| Face numeral | Type of surface | Radius of curvature | Thickness | Material | Conic constant |
| --- | --- | --- | --- | --- | --- |
| OBJ | spherical surface | infinity | infinity | — | — |
| S1 | aspheric surface | 1.4808 | 0.6040 | 1.544/56.11 | 0.2294 |
| S2 | aspheric surface | 3.6502 | 0.0306 | — | 0.9415 |
| S3 | aspheric surface | 2.5449 | 0.4102 | 1.544/56.11 | −2.3903 |
| S4 | aspheric surface | −100.8088 | 0.0387 | — | −173.7650 |
| STO | spherical surface | infinity | 0.0786 | — | — |
| S5 | aspheric surface | −5.4942 | 0.2181 | 1.651/21.52 | 3.9877 |
| S6 | aspheric surface | 3.3118 | 0.1816 | — | −8.6874 |
| S7 | aspheric surface | 4.6794 | 0.2332 | 1.651/21.52 | −44.1015 |
| S8 | aspheric surface | 6.3390 | 1.2120 | — | −104.8584 |
| S9 | aspheric surface | −8.9339 | 0.2300 | 1.544/56.11 | 16.8806 |
| S10 | aspheric surface | 4.6199 | 0.1855 | — | −39.6583 |
| S11 | aspheric surface | −3.6483 | 0.7978 | 1.651/21.52 | −38.4903 |
| S12 | aspheric surface | −4.2643 | 0.3524 | — | −0.5616 |
| S13 | spherical surface | infinity | 0.1100 | 1.517/64.17 | — |
| S14 | spherical surface | infinity | 0.1892 | — | — |
| S15 | spherical surface | infinity | — | — | — |

TABLE 14

| Face numeral | A4 | A6 | A8 | A10 | A12 | A14 | A16 |
|---|---|---|---|---|---|---|---|
| S1 | −1.3339E−02 | −5.9463E−02 | 1.3996E−01 | −3.1369E−01 | 3.6244E−01 | −2.3522E−01 | 5.9024E−02 |
| S2 | −2.9139E−02 | −2.8724E−01 | 1.0568E+00 | −2.0168E+00 | 1.9521E+00 | −9.4717E−01 | 1.8664E−01 |
| S3 | 1.1053E−02 | −2.9757E−01 | 1.2296E+00 | −2.2804E+00 | 2.0119E+00 | −8.1451E−01 | 1.2444E−01 |
| S4 | 8.6838E−02 | 2.1404E−02 | −3.4069E−01 | 7.7296E−01 | −1.2142E+00 | 1.0146E+00 | −3.2521E−01 |
| S5 | 1.8435E−01 | 9.7790E−04 | −9.8224E−01 | 3.5938E+00 | −5.6846E+00 | 4.2837E+00 | −1.2963E+00 |
| S6 | 4.3676E−02 | 4.0772E−01 | −2.2615E+00 | 9.3083E+00 | −1.6689E+01 | 1.6624E+01 | −7.4802E+00 |
| S7 | −7.2172E−02 | 2.6112E−01 | −5.2754E−01 | 2.3317E+00 | −2.1808E+00 | −6.3216E−01 | 1.4156E+00 |
| S8 | 8.3310E−02 | 3.9196E−01 | −2.0204E+00 | 7.4587E+00 | −1.4540E+01 | 1.4812E+01 | −5.7093E+00 |
| S9 | −1.5584E−01 | −6.3872E−02 | 1.3866E−01 | −1.2454E−01 | 7.0376E−02 | −1.9808E−02 | 2.0361E−03 |
| S10 | −2.6275E−02 | −9.1309E−02 | 1.2189E−01 | −8.1992E−02 | 3.1198E−02 | −6.4116E−03 | 5.4207E−04 |
| S11 | 5.8490E−03 | −1.6359E−04 | −2.1769E−05 | 7.7602E−06 | 3.6847E−06 | 2.4209E−07 | −1.9787E−07 |
| S12 | −4.7607E−02 | 1.3342E−02 | −5.5268E−04 | −1.8737E−05 | −5.6435E−06 | −4.6981E−07 | 1.1878E−07 |

TABLE 15

| f1(mm) | 4.16 | f(mm) | 5.44 |
|---|---|---|---|
| f2(mm) | 4.55 | Fno | 2.13 |
| f3(mm) | −3.12 | TTL(mm) | 4.87 |
| f4(mm) | 25.79 | HFOV(deg) | 25.40 |
| f5(mm) | −5.54 | | |
| f6(mm) | −79.06 | | |

The Sixth Embodiment

Referring to FIG. 26 to FIG. 30, a telephoto camera lens according to the sixth embodiment satisfies conditions in table 16 to table 18.

TABLE 16

| Face numeral | Type of surface | Radius of curvature | Thickness | Material | Conic constant |
|---|---|---|---|---|---|
| OBJ | spherical surface | infinity | infinity | — | — |
| S1 | aspheric surface | 1.3088 | 0.7667 | 1.544/56.11 | −0.0694 |
| S2 | aspheric surface | −19.2289 | 0.0812 | — | −57.6429 |
| STO | spherical surface | infinity | −0.0004 | — | — |
| S3 | aspheric surface | −12.1864 | 0.2401 | 1.651/21.52 | −50.5052 |
| S4 | aspheric surface | 3.4774 | 0.3092 | — | −99.8634 |
| S5 | aspheric surface | −105.1194 | 0.2911 | 1.544/56.11 | −80.9071 |
| S6 | aspheric surface | −79.7683 | 0.2517 | — | 6.7929 |
| S7 | aspheric surface | −5.9623 | 0.2444 | 1.544/56.11 | 19.4499 |
| S8 | aspheric surface | −1000.0000 | 1.0353 | — | −99.4322 |
| S9 | aspheric surface | −2.4155 | 0.2621 | 1.544/56.11 | −10.1276 |
| S10 | aspheric surface | −2.3395 | 0.0404 | — | −99.0528 |
| S11 | aspheric surface | −2.5327 | 0.5834 | 1.651/21.52 | −98.6807 |
| S12 | aspheric surface | −5.9795 | 0.2075 | — | −1.9327 |
| S13 | spherical surface | infinity | 0.2198 | 1.517/64.17 | — |
| S14 | spherical surface | infinity | 0.3864 | — | — |
| S15 | spherical surface | infinity | — | — | — |

TABLE 17

| Face numeral | A4 | A6 | A8 | A10 | A12 | A14 | A16 |
|---|---|---|---|---|---|---|---|
| S1 | 2.3402E−03 | −5.1334E−02 | 1.7500E−01 | −3.8140E−01 | 4.4924E−01 | −2.8803E−01 | 7.2750E−02 |
| S2 | 1.4166E−01 | −4.8357E−01 | 8.3917E−01 | −8.7579E−01 | 5.2475E−01 | −1.4462E−01 | 7.5471E−03 |
| S3 | 3.4636E−01 | −1.0629E+00 | 2.1459E+00 | −2.6719E+00 | 2.0105E+00 | −6.8315E−01 | 1.1878E−02 |
| S4 | 6.3206E−01 | −1.4840E+00 | 2.3690E+00 | 2.1434E+00 | −1.7264E+01 | 3.0695E+01 | −1.9207E+01 |
| S5 | 1.5928E−01 | −3.4071E−01 | −1.1595E+00 | 1.0638E+01 | −3.5436E+01 | 5.7236E+01 | −3.7564E+01 |
| S6 | 1.4072E−02 | −3.2212E−01 | −1.6390E+00 | 9.0792E+00 | −2.3150E+01 | 3.0395E+01 | −1.7254E+01 |
| S7 | −1.1463E−01 | −7.6664E−01 | 5.8938E−01 | 7.8853E−01 | −7.2514E+00 | 1.6671E+01 | −1.3205E+01 |
| S8 | 1.6078E−02 | −3.1132E−01 | 3.0467E−01 | 1.6549E−01 | −1.4081E−01 | −1.0632E−01 | 5.9823E−02 |
| S9 | 4.4921E−02 | −3.2094E−01 | 3.8647E−01 | −2.4978E−01 | 8.9992E−02 | −1.5379E−02 | 9.4341E−04 |
| S10 | 1.4136E−01 | −3.8126E−01 | 4.2424E−01 | −2.7368E−01 | 1.0350E−01 | −2.1510E−02 | 1.8880E−03 |
| S11 | −4.2913E−02 | 8.5340E−02 | −6.1781E−02 | 2.5402E−02 | −6.0572E−03 | 7.6701E−04 | −3.9678E−05 |
| S12 | −9.4532E−02 | 1.2057E−01 | −7.7319E−02 | 2.9024E−02 | −6.1906E−03 | 6.9009E−04 | −3.1236E−05 |

TABLE 18

| | | | |
|---|---|---|---|
| f1(mm) | 2.27 | f(mm) | 5.53 |
| f2(mm) | −4.10 | Fno | 2.27 |
| f3(mm) | 603.41 | TTL(mm) | 4.92 |
| f4(mm) | −10.99 | HFOV(deg) | 26.70 |
| f5(mm) | 61.40 | | |
| f6(mm) | −7.18 | | |

The Seventh Embodiment

Referring to FIG. 31 to FIG. 35, a telephoto camera lens according to the seventh embodiment satisfies conditions in table 19 to table 21.

TABLE 19

| Face numeral | Type of surface | Radius of curvature | Thickness | Material | Conic constant |
|---|---|---|---|---|---|
| OBJ | spherical surface | infinity | infinity | — | — |
| S1 | aspheric surface | 1.4447 | 0.5720 | 1.544/56.11 | 0.1341 |
| S2 | aspheric surface | 3.3332 | 0.0309 | — | 1.4889 |
| S3 | aspheric surface | 2.6036 | 0.4005 | 1.544/56.11 | −3.3272 |
| S4 | aspheric surface | −95.4699 | 0.0196 | — | −71.6655 |
| STO | spherical surface | infinity | 0.0671 | — | — |
| S5 | aspheric surface | −8.4006 | 0.2322 | 1.651/21.52 | 4.0113 |
| S6 | aspheric surface | 3.1171 | 0.1139 | — | −10.4359 |
| S7 | aspheric surface | 3.5795 | 0.2332 | 1.651/21.52 | −41.6579 |
| S8 | aspheric surface | 3.3174 | 1.4149 | — | −101.8375 |
| S9 | aspheric surface | −6.1522 | 0.2539 | 1.544/56.11 | 9.1734 |
| S10 | aspheric surface | 7.8991 | 0.2425 | — | −30.9615 |
| S11 | aspheric surface | −4.1708 | 0.6837 | 1.651/21.52 | −19.4496 |
| S12 | aspheric surface | −3.5272 | 0.3582 | — | −0.3546 |
| S13 | spherical surface | infinity | 0.1162 | 1.517/64.17 | — |
| S14 | spherical surface | infinity | 0.1999 | — | — |
| S15 | spherical surface | infinity | — | — | — |

TABLE 20

| Face numeral | A4 | A6 | A8 | A10 | A12 | A14 | A16 |
|---|---|---|---|---|---|---|---|
| S1 | −9.6309E−03 | −5.7924E−02 | 1.4956E−01 | −3.2477E−01 | 3.7773E−01 | −2.4385E−01 | 5.9506E−02 |
| S2 | −9.4267E−02 | 1.3522E−01 | 2.2563E−01 | −1.1746E+00 | 1.4142E+00 | −6.9883E−01 | 1.2458E−01 |
| S3 | −6.8726E−02 | 1.7310E−01 | 3.6570E−01 | −1.7022E+00 | 1.8120E+00 | −6.2468E−01 | 2.2010E−02 |
| S4 | 7.4086E−02 | 5.3964E−01 | −2.4819E+00 | 3.9658E+00 | −3.3739E+00 | 1.7019E+00 | −4.1209E−01 |
| S5 | 1.4818E−01 | 7.9835E−01 | −4.9363E+00 | 1.3777E+01 | −2.0592E+01 | 1.6132E+01 | −5.2398E+00 |
| S6 | −1.5285E−01 | 1.5457E+00 | −8.2626E+00 | 3.1989E+01 | −6.1881E+01 | 6.4830E+01 | −2.9218E+01 |
| S7 | −1.9153E−01 | 9.6176E−01 | −4.3179E+00 | 1.9630E+01 | −4.1471E+01 | 4.2922E+01 | −1.7169E+01 |
| S8 | 3.4769E−01 | −5.2463E−01 | 5.4678E−01 | 6.2598E+00 | −2.4057E+01 | 3.5194E+01 | −1.8721E+01 |
| S9 | −1.2231E−01 | −6.4324E−02 | 1.1843E−01 | −8.0948E−02 | 3.6461E−02 | −9.0094E−03 | 8.8419E−04 |
| S10 | −3.3591E−02 | −7.7924E−02 | 1.0020E−01 | −6.4502E−02 | 2.3233E−02 | −4.5345E−03 | 3.7195E−04 |
| S11 | 1.4301E−02 | −4.4203E−03 | −8.4435E−04 | −9.9995E−05 | 1.7171E−05 | 6.1809E−06 | 1.6552E−06 |
| S12 | −3.8745E−02 | 1.4936E−02 | −1.5722E−03 | −2.1982E−04 | −2.8577E−05 | 3.2334E−06 | 2.9775E−06 |

TABLE 21

| | | | |
|---|---|---|---|
| f1(mm) | 4.22 | f(mm) | 5.54 |
| f2(mm) | 4.65 | Fno | 2.60 |
| f3(mm) | −3.44 | TTL(mm) | 4.94 |
| f4(mm) | −106.61 | HFOV(deg) | 26.71 |
| f5(mm) | −6.29 | | |
| f6(mm) | 24.51 | | |

From the first to seventh embodiments, conditional expressions satisfy conditions in the following table.

| | Embodiment | | | | | | |
|---|---|---|---|---|---|---|---|
| Conditional expression | 1 | 2 | 3 | 4 | 5 | 6 | 7 |
| TTL/f | 0.883 | 0.892 | 0.922 | 0.897 | 0.895 | 0.890 | 0.892 |
| ImgH/f | 0.509 | 0.514 | 0.532 | 0.518 | 0.496 | 0.511 | 0.515 |
| |f2/f| | 0.831 | 0.746 | 0.892 | 0.855 | 0.836 | 0.741 | 0.839 |

-continued

| Conditional expression | Embodiment | | | | | | |
|---|---|---|---|---|---|---|---|
| | 1 | 2 | 3 | 4 | 5 | 6 | 7 |
| f1/f56 | −0.459 | −0.298 | −0.562 | −0.498 | −0.749 | −0.293 | −0.437 |
| T45/TTL | 0.285 | 0.211 | 0.257 | 0.282 | 0.249 | 0.210 | 0.286 |
| f12/f | 0.426 | 0.682 | 0.462 | 0.444 | 0.430 | 0.678 | 0.430 |
| f34/f | −0.574 | −2.062 | −0.696 | −0.628 | −0.647 | −2.024 | −0.584 |
| R2/R3 | 1.281 | 1.572 | 1.422 | 1.424 | 1.434 | 1.578 | 1.280 |
| R7/R8 | 1.094 | 0.018 | 0.757 | 0.984 | 0.738 | 0.006 | 1.079 |
| |(R11 − R12)/(R11 + R12)| | 0.066 | 0.422 | 0.044 | 0.012 | 0.078 | 0.405 | 0.084 |
| |(R9 − R12)/(R9 + R12)| | 0.255 | 0.441 | 0.375 | 0.442 | 0.354 | 0.425 | 0.271 |

Reference throughout this specification to "one embodiment," "some embodiments," "explanatory embodiments", "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

In the description of the present disclosure, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, i.e. two, three and the like, unless specified otherwise.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A telephoto camera lens comprising: from an object side to an image side,
    a first lens with positive optical power, an object-side face of the first lens being convex;
    a second lens with optical power;
    a third lens with optical power;
    a fourth lens with optical power;
    a fifth lens with optical power, an object-side face of the fifth lens being concave; and
    a sixth lens with optical power, an object-side face of the sixth lens being concave near an axis, and an image-side face of the sixth lens being convex near the axis,
    wherein the telephoto camera lens satisfies the following relation: $0.75<TTL/f<1.0$, and $ImgH/f<0.55$,
    wherein, TTL represents a distance between the object-side face of the first lens and an imaging plane along the axis, f represents an effective focal length of the telephoto camera lens, and ImgH is half of a diagonal line of an effective pixel region on the imaging plane,
    wherein the telephoto camera lens satisfies the following relation: $-1.0<f1/f56<0$,
    wherein, f1 represents an effective focal length of the first lens, and f56 represents a combined focal length of the fifth lens and the sixth lens.

2. The telephoto camera lens according to claim 1, wherein the telephoto camera lens satisfies the following relation: $0.65<|f2/f|<1.0$,
    wherein, f2 represents an effective focal length of the second lens.

3. The telephoto camera lens according to claim 1, wherein, the telephoto camera lens satisfies the following relation: $0<T45/TTL<0.3$,
    wherein, T45 represents a distance between the fourth lens and the fifth lens along an axis.

4. The telephoto camera lens according to claim 1, wherein, the telephoto camera lens satisfies the following relation: $0<R7/R8<2.0$,
    wherein, R7 represents a radius of curvature of an object-side face of the fourth lens, and R8 represents a radius of curvature of an image-side face of the fourth lens.

5. The telephoto camera lens according to claim 1, wherein, the telephoto camera lens satisfies the following relation: $|(R11-R12)/(R11+R12)|\leq0.5$, and $|(R9-R12)/(R9+R12)|\leq1.0$,
    wherein, R9 represents a radius of curvature of the object-side face of the fifth lens, R11 represents a radius of curvature of the object-side face of the sixth lens, and R12 represents a radius of curvature of the image-side face of the sixth lens.

6. A telephoto camera lens comprising: from an object side to an image side,
    a first lens with positive optical power, an object-side face of the first lens being convex;
    a second lens with optical power;
    a third lens with optical power;
    a fourth lens with optical power;
    a fifth lens with optical power, an object-side face of the fifth lens being concave; and
    a sixth lens with optical power, an object-side face of the sixth lens being concave near an axis, and an image-side face of the sixth lens being convex near the axis,
    wherein the telephoto camera lens satisfies the following relation: $0.75<TTL/f<1.0$, and $ImgH/f<0.55$,
    wherein, TTL represents a distance between the object-side face of the first lens and an imaging plane along the axis, f represents an effective focal length of the telephoto camera lens, and ImgH is half of a diagonal line of an effective pixel region on the imaging plane,
    wherein, the telephoto camera lens satisfies the following relation: $0.4<f12/f<1.0$, and $-2.5<f34/f<0$, and
    wherein, f12 represents a combined focal length of the first lens and the second lens, and f34 represents a combined focal length of the third lens and the fourth lens.

7. A telephoto camera lens comprising: from an object side to an image side, a first lens with positive optical power, an object-side face of the first lens being convex;
a second lens with optical power;
a third lens with optical power;
a fourth lens with optical power;
a fifth lens with optical power, an object-side face of the fifth lens being concave; and
a sixth lens with optical power, an object-side face of the sixth lens being concave near an axis, and an image-side face of the sixth lens being convex near the axis,
wherein the telephoto camera lens satisfies the following relation: $0.75 < TTL/f < 1.0$, and $ImgH/f < 0.55$,
wherein, TTL represents a distance between the object-side face of the first lens and an imaging plane along the axis, f represents an effective focal length of the telephoto camera lens, and ImgH is half of a diagonal line of an effective pixel region on the imaging plane,
wherein, the telephoto camera lens satisfies the following relation: $1.0 < R2/R3 < 2.0$, and
wherein, R2 represents a radius of curvature of an image-side face of the first lens, and R3 represents a radius of curvature of an object-side face of the second lens.

* * * * *